(12) United States Patent
Branson et al.

(10) Patent No.: US 6,968,550 B2
(45) Date of Patent: *Nov. 22, 2005

(54) APPARATUS AND METHOD FOR SYNCHRONIZING SOFTWARE BETWEEN COMPUTERS

(75) Inventors: Michael John Branson, Rochester, MN (US); George Francis DeStefano, Rochester, MN (US); Ronald Joseph Haugen, Rochester, MN (US); Gregory Richard Hintermeister, Rochester, MN (US); Gregory Scott Hurlebaus, Rochester, MN (US); Erik Duane Lindberg, Pine Island, MN (US); David Henry Sandifer, Rochester, MN (US); Susette Marie Townsend, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 501 days.

This patent is subject to a terminal disclaimer.

(21) Appl. No.: 10/051,405

(22) Filed: Jan. 18, 2002

(65) Prior Publication Data

US 2004/0015942 A1 Jan. 22, 2004

Related U.S. Application Data

(62) Division of application No. 09/314,951, filed on May 19, 1999.

(51) Int. Cl.$^7$ .................................................. G06F 9/44
(52) U.S. Cl. ...................... 717/168; 717/172; 717/174
(58) Field of Search ............................... 717/168–178; 707/203, 204

(56) References Cited

U.S. PATENT DOCUMENTS 4,558,413 A * 12/1985 Schmidt et al. ............. 707/203

(Continued)

FOREIGN PATENT DOCUMENTS

JP PUPA 63-098029 4/1988

(Continued)

OTHER PUBLICATIONS

Choi et al, "Stack allocation and synchronization optimization for Java using escape analysis", ACM Trans on Prog. Lang and Sys. vol. 25, No. 6, pp 876-910, Nov. 2003.*

(Continued)

*Primary Examiner*—Anil Khatri
(74) *Attorney, Agent, or Firm*—Steven W. Roth

(57) ABSTRACT

A method and apparatus for synchronizing software between computers are disclosed. A software fix manager compares a preferred software inventory with a software inventory from a computer that is to be synchronized and, from this comparison, creates a number of software product synchronizations. An update manager uses the software fix list to apply software product synchronizations to the computer. Preferably, the computer can be brought to the same fix level or product level, if desired, as the preferred software inventory through this process. The software fix manager can place synchronizations in a fix list. There can be multiple software product synchronizations per software product, and the synchronizations can be applied to a computer by removing a software product fix or installing a product software fix. The current invention may also be applied to software products themselves, by installing or removing software products. The present invention potentially has its best application in networks, as numerous target computers or groups of target computers may be synchronized with a preferred software inventory of a model system.

61 Claims, 10 Drawing Sheets

U.S. PATENT DOCUMENTS

| | | | |
|---|---|---|---|
| 5,349,674 A | 9/1994 | Calvert et al. | 395/800 |
| 5,410,703 A * | 4/1995 | Nilsson et al. | 717/168 |
| 5,758,340 A | 5/1998 | Nail | 707/9 |
| 5,761,504 A | 6/1998 | Corrigan et al. | 395/652 |
| 5,793,982 A | 8/1998 | Shrader et al. | 395/200.62 |
| 5,848,154 A * | 12/1998 | Nishio et al. | 705/51 |
| 5,867,714 A * | 2/1999 | Todd et al. | 717/172 |
| 5,887,192 A * | 3/1999 | Nishio | 710/7 |
| 6,067,622 A | 5/2000 | Moore | 713/200 |
| 6,110,228 A | 8/2000 | Albright et al. | 717/11 |
| 6,135,651 A | 10/2000 | Leinfelder et al. | 395/712 |
| 6,138,274 A | 10/2000 | Huang et al. | 717/11 |
| 6,202,207 B1 * | 3/2001 | Donohue | 717/173 |
| 6,205,579 B1 | 3/2001 | Southgate | 717/11 |
| 6,256,773 B1 | 7/2001 | Bowman-Amuah | 717/1 |
| 6,874,143 B1 * | 3/2005 | Murray et al. | 717/173 |
| 6,889,158 B2 * | 5/2005 | Penov et al. | 702/119 |

FOREIGN PATENT DOCUMENTS

| | | |
|---|---|---|
| JP | PUPA 02-249026 | 10/1990 |
| JP | PUPA 04-030218 | 2/1992 |
| JP | PUPA 10-021061 | 1/1998 |

OTHER PUBLICATIONS

Veitch et al, "Robust synchronization of software clocks across the internet", ACM IMC, pp 219-232, Oct. 2004.*

Laventhal, "A constructive approach to reliable synchronization code", IEEE, pp 194-202, 1979.*

Lee et al, "Reducing coherence overhead of barrier synchronization in software DSMS", IEEE SC, pp 1-18, 1998.*

Laventhal, "A Constructive Approach to Reliable Synchronization Code," IEEE—CHI, pp. 194-202, 1979.

Graunke et al., "Synchronization Algorithms for Shared-Memory Multiprocessors," IEEE—Computer, pp. 60-69, 1990.

Hsiung, "Timing Coverification of Concurrent Embedded Real-Time Systems," ACM Codes, pp. 110-114, 1999.

Agarwal et al., "Adaptive Backoff Synchronization Techniques," ACM, pp. 396-406, 1989.

* cited by examiner

117

| s/w Prod 1 | 0.9.0 | ⎫ 427 |
| s/w Prod 2 | 2.0.0 | ⎫ 437 |
| s/w Prod 3 | 3.5.1 | ⎫ 447 |
| s/w Prod 4 | 4.0.3 | ⎫ 457 |

405  410

112

| Fix_ID_1 | s/w Prod 1 | 0.9.0 | ⎫ 425 |
| Fix_ID_11 | s/w Prod 1 | 0.9.0 | ⎫ 430 |
| Fix_ID_2 | s/w Prod 2 | 2.0.0 | ⎫ 435 |
| Fix_ID_12 | s/w Prod 2 | 2.0.0 | ⎫ 440 |
| Fix_ID_3 | s/w Prod 3 | 3.5.1 | ⎫ 445 |

400  405  410

147

| s/w Prod 1 | 0.9.0 | ⎫ 452 |
| s/w Prod 2 | 2.0.0 | ⎫ 453 |
| s/w Prod 3 | 3.5.1 | ⎫ 454 |
| s/w Prod 4 | 4.0.3 | ⎫ 456 |

405  410

141

| Fix_ID_1 | s/w Prod 1 | 0.9.0 | ⎫ 450 |
| Fix_ID_7 | s/w Prod 2 | 2.0.0 | ⎫ 455 |
| Fix_ID_3 | s/w Prod 3 | 3.5.1 | ⎫ 460 |
| Fix_ID_13 | s/w Prod 3 | 3.5.1 | ⎫ 465 |
| Fix_ID_14 | s/w Prod 4 | 4.0.3 | ⎫ 466 |

400  405  410

162

| 430 | X | ⎫ 477 |
| 440 | X | ⎫ 479 |
| 435 | X | ⎫ 480 |
| 455 |   | ⎫ 481 |
| 465 |   | ⎫ 482 |
| 466 |   | ⎫ 483 |

127:
| s/w Prod 3 | 3.7.0 | } 528 |
| s/w Prod 4 | 4.0.3 | } 529 |

405, 410

122:
| Fix_ID_10 | s/w Prod 3 | 3.7.0 | } 510 |
| Fix_ID_16 | s/w Prod 4 | 4.0.3 | } 520 |

400, 405, 410

147:
| s/w Prod 1 | 0.9.0 | } 452 |
| s/w Prod 2 | 2.0.0 | } 453 |
| s/w Prod 3 | 3.5.1 | } 454 |
| s/w Prod 4 | 4.0.3 | } 456 |

405, 410

141:
| Fix_ID_1 | s/w Prod 1 | 0.9.0 | } 450 |
| Fix_ID_7 | s/w Prod 2 | 2.0.0 | } 455 |
| Fix_ID_3 | s/w Prod 3 | 3.5.1 | } 460 |
| Fix_ID_13 | s/w Prod 3 | 3.5.1 | } 465 |
| Fix_ID_14 | s/w Prod 4 | 4.0.3 | } 466 |

400, 405, 410

162:
| 430 | X | } 477 |
| 440 | X | } 479 |
| 435 | X | } 480 |
| 455 |   | } 481 |
| 465 |   | } 482 |
| 466 |   | } 483 |
| 520 | X | } 584 |

467, 470

APPARATUS AND METHOD FOR SYNCHRONIZING SOFTWARE BETWEEN COMPUTERS

REFERENCE TO PARENT APPLICATION

This application is a divisional of U.S. Ser. No. 09/314,951, filed on May 19, 1999 by Michael John Branson et al., and entitled "Apparatus and Method for Synchronizing Software Between Computers", which is hereby incorporated by reference.

BACKGROUND OF THE INVENTION

1. Technical Field

This invention generally relates to updating software. More specifically, this invention relates to an apparatus and method for synchronizing software between one or more computers.

2. Background Art

Computers have progressed from taking rooms full of vacuum tubes to becoming tiny, hand-held devices. Computers in some form or another control most of the products with which we come in contact during our lives. They control the anti-lock brake systems in our cars, the timing of the lights that we encounter on our way to work, where the elevator stops on the way to our offices, and temperature of our offices. Furthermore, they control and affect our primary work environment, as most people use computers every day as part of their jobs.

As computers have become ubiquitous, so has the software that is needed to run them. While computers evolved from tubes to miniature devices made of silicon, software has also developed from punch cards to sophisticated programs capable of rendering and shading three-dimensional objects, performing complex calculations on simulated loaded beams, and performing other feats that were previously impossible. Not only has the sophistication of software dramatically increased, but the pace of additions, modifications, and changes to software has quickened dramatically.

Previously, a new release of a software product occurred about two or three years after the previous release of the product. Today, a two year timetable seems to be preferred, and many timetables are shorter. Furthermore, because of the complexity of software, as soon as the software product is released, errors (commonly called "bugs", after a famous incident where an insect shorted out a vacuum tube and caused errors) are found. These errors are generally attended to immediately by the software product's programmers, who find a "fix" or "patch" for the program. These fixes or patches are usually distributed to registered owners of the software product, or placed on an Internet website where the software product owner can download the fix. Thus, between major updates of software are numerous (and sometimes substantial) fixes to the software product.

These multiple updates and fixes have become problematic for many individuals and businesses. Due to the sheer number of fixes for all of the software products on a computer system, the individual responsible for maintaining the computer system may not even know that fixes or updates exist for the system. The individual must himself or herself ferret out the fixes and updates. In addition, there is the potentially devastating effect that one software fix may actually "break" or cause errors in another software program or even the software product that the fix is supposed to update.

These problems are particularly onerous for computers that are connected through one or more networks. In these systems, there is generally one or more system administrators that are responsible for the upkeep of a number of computer systems. For instance, a large network may have several system administrators, each of which are responsible for a number of computer systems in his or her area. The system administrator for the north-west area might put a patch that fixes a security problem on one computer in her network. She would test the patch to ensure that it causes less harm than benefit, and then manually apply the patch to each computer in her area.

Meanwhile, the system administrator (SA) in charge of the computers in the south-east area has applied a fix to an operating system component on one computer in the network. Unfortunately, this fix has had a devastating effect on one important software product. The south-east area SA decides to add an update to the software product in hopes that this will eliminate the effect caused by the operating system fix. However, the effect is still there after application of the update, but the update has solved other problems associated with the software product. The south-east area SA decides to uninstall the operating system component, but the component does not uninstall correctly, and the SA must manually uninstall the fix and reinstall part or all of the operating system.

Neither SA knows what the other SA is doing. In this example, the north-west area SA might apply the same fix to the same operating system and experience the same effects. The south-east SA might not know that a patch for the security flaw exists and may be leery of applying the patch after the destruction caused by the operating system fix. Each SA might rediscover the problems or benefits caused by a fix or patch that the other has already discovered.

These system administrators have other administration duties that are also inefficient. It is very hard to determine the fix level of any computer without actually visiting that computer. Thus, one computer may have a patch or fix installed, but the computer immediately next to it may not have the same patch or fix. This can lead to level mismatches in the enterprise, where some computers are at one fix level and other computers are at another fix level.

Level mismatches can sometimes create problems. For instance, a patch may be developed that fixes a problem with a database that, in certain cases, could cause a non-obvious error. If this patch is applied to some but not all of the computers in a network, a person accessing more than one database (on multiple computers) may get different, anomalous results. Even if the person sees the anomaly, he or she might give the database the benefit of the doubt and use the erroneous information regardless. If all databases on all computers had the same patch, the non-obvious error would not occur.

Even if the SA can remotely determine the software fixes that are applied on one computer, additional or different software fixes for that computer must be manually installed. A significant quantity of time can be invested in just updating computers, as each computer must be accessed to determine the software fixes that are installed, and then additional or different software fixes must be applied to each computer. In small networks this process can take quite a bit of time, and in large networks this process can take weeks or months.

Without a method and apparatus for synchronizing software in a network, system administrators will continue to rediscover software problems, will have more computers that are at different software fix levels, will have to keep track of the software fix level of each computer in the network, and will have to manually update each computer in the network.

BRIEF SUMMARY OF INVENTION

The preferred embodiments of the present invention provide a method and apparatus for synchronizing software between computers. A software fix manager compares a preferred software inventory with a software inventory from a computer that is to be synchronized. The software fix manager generates a number of synchronizations from this comparison, preferably packaging these synchronizations into a fix list. An update manager uses the software fix list to apply software product synchronizations to the computer. Preferably, the computer can be brought to the same fix level or product level, if desired, as the preferred software inventory through this process.

The fix list is a list of software product synchronizations. There can be multiple software product synchronizations per software product, and the synchronizations can be applied to a computer by removing a software product fix or installing a product software fix. The current invention may also be applied to software products themselves, by installing or removing software products.

The present invention potentially has its best application in networks, as numerous target computers or groups of target computers may be synchronized with a preferred software inventory of a model system.

The foregoing and other features and advantages of the present invention will be apparent in the preferred embodiments of the invention, as illustrated in the accompanying drawings.

BRIEF DESCRIPTION OF DRAWINGS

The preferred exemplary embodiments of the present invention will hereinafter be described in conjunction with the appended drawings, wherein like designations denote like elements, and:

FIGS. 7 and 8 illustrate comparing software inventories from computers on the network with a preferred software fix inventory to create a fix list in accordance with a preferred embodiment of the present invention.

DETAILED DESCRIPTION OF INVENTION

Figure 1:
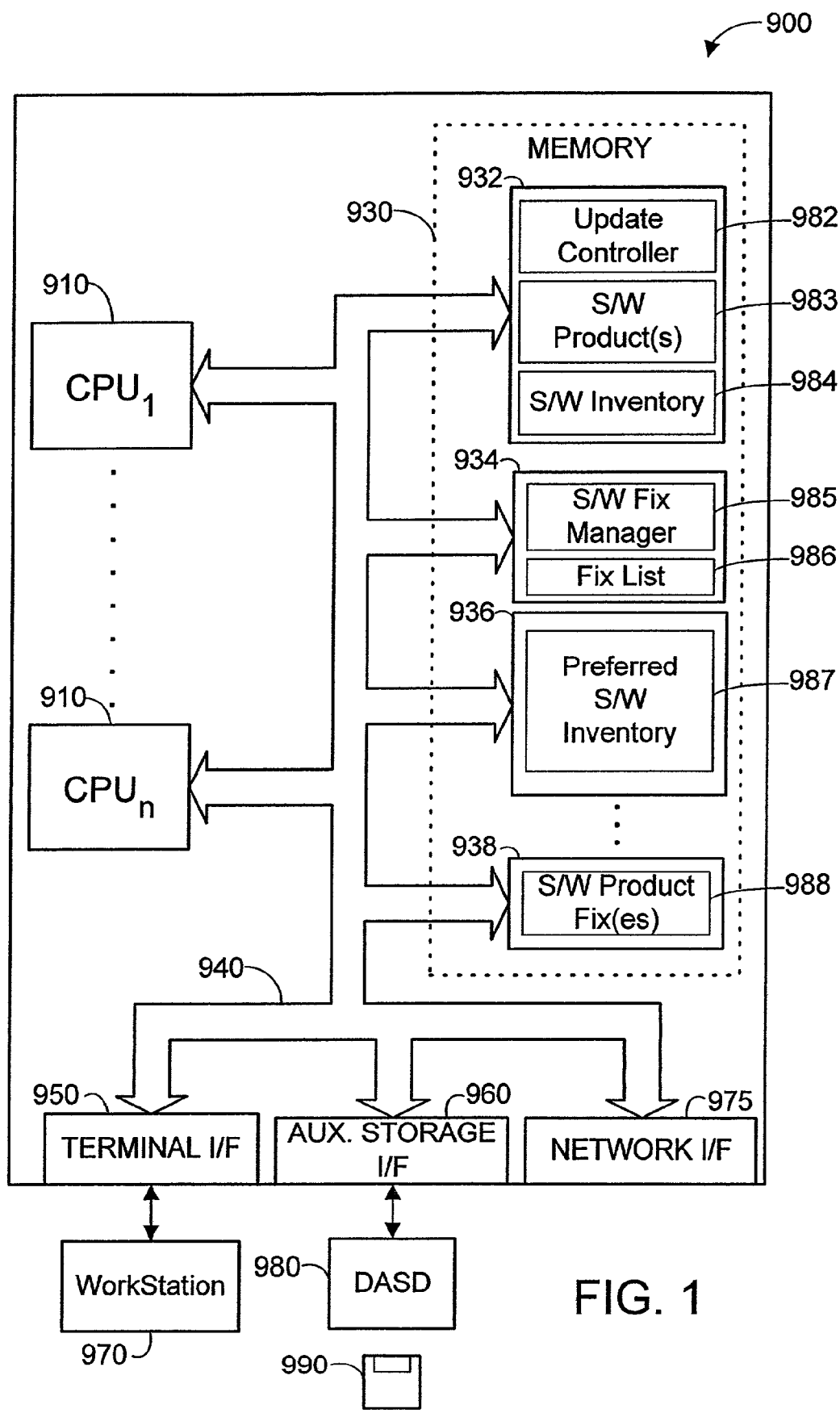
FIG. 1 is a computer system in accordance with a preferred embodiment of the present invention.

The preferred embodiments of the present invention provide a method and apparatus for synchronizing software between computers. A software fix manager compares a preferred software inventory with a software inventory from a computer that is to be synchronized. The software fix manager creates a number of software product synchronizations based on this comparison, and preferably places these synchronizations in a fix list. An update manager uses the software fix list to apply software product synchronization to the computer. Preferably, the computer can be brought to the same fix level or product level as the preferred software inventory through this process. The fix list is a list of software product synchronizations. There can be multiple software product synchronizations per software product, and the synchronizations can be applied to a computer by removing a software product fix, installing a software product fix, or installing or removing a software product.

The present invention potentially has its best application in networks, as numerous target computers or groups of target computers can be synchronized with a preferred software inventory of a model system. Preferably, each computer to be updated has two software inventories, a software product inventory and a software fix inventory. The former describes which software products have been installed and at what release the products are. The latter describes the fixes added to releases of the software product. The software fix manager is preferably installed on a central location (also called a managing computer) in a network whereby system administrators can log into the system and run the software fix manager on the managing computer. The software fix manager gathers or receives software inventories from a number of computer systems in the network, and these software inventories are compared to a preferred software inventory. The preferred software fix inventory and preferred software product inventory are generally derived from one computer (called a model system) that has a preferred mixture of software products and software product fixes on it.

The software fix manager creates a fix list of software product synchronizations, and the update controller on each computer in the network applies the software product synchronizations to its own computer. Preferably, the fix list is a union of all the software product synchronizations (and fix records) for each computer in the network that is being updated. Because the fix list is preferably a union, the update controller on each target computer may have to ignore some software product synchronizations that are not applicable to it. Each software product synchronization is a directive to install or remove a software product fix, which may also indicate installation or removal of a software product. These details will become more apparent during later, more in-depth discussions of these topics.

Before proceeding to detailed discussions of the embodiments of the current invention, it is beneficial to discuss terminology that is used herein. A "software product" is a release of software for a computer system. A software product could be an operating system, financial software, office software, an internet browser, text-editing software, a child's game, etc. In addition, a software product could be drivers for printers, video cards, sound cards, etc. A "release" of a software product is intended to be complete. Releases generally have new version numbers that have years or whole numbers associated with them, such as Version 97 or Version 2.0. A software fix is a permanent or temporary change or addition to the software product. General terms for these types of software fixes include an "update" or a "patch." Updates are usually permanent fixes for software products and are minor changes to the software product, while patches are usually temporary pieces of software that fix one or more problems. A more permanent fix for the problem usually follows the patch. For some operating systems (i.e., OS/400), the term "permanent" means that the fix is installed permanently and cannot be removed, while the term "temporary" means that the fix may be removed or uninstalled.

In general then, "software product" is intended to indicate a working version of a software product, while a "software product fix" is intended to indicate additions or changes to the software product that are not a complete version of the software product. The term "software product synchronization" encompasses installing a software product fix, attempting to remove and removing a software product fix, installing a software product, or uninstalling a software product.

Finally, a "fix record" is a term used to indicate a particular software fix for a software product at a particular release, while a "product record" is used to indicate a software product at a particular release. Some manufacturers use dates for these (such as Version 97 or Mar. 7, 1999 Fix), or a combination of these (such as Version 97, Update 1). In the latter example, the product record could be "Software Product A, Version 97", while the fix record would be "Update 1, Software Product A, Version 97". These concepts will be more apparent in later discussions. Furthermore, other manufacturers use numbers and letters (such as Version 2.03a) for the product record and fix record. Additionally, some manufacturers also add "build levels", "service pack" numbers, or additional identifying indicia. In short, a "product record" is any indicia used to track the software product, and a "fix record" is any indicia used to track software fixes added to the product.

Turning now to FIG. 1, a computer system 900 in accordance with a preferred embodiment of the present invention includes a plurality of Central Processing Units (CPUs) 910, a terminal interface 950, an auxiliary storage interface 960, a workstation 970, a Direct Access Storage Device (DASD) 980, a bus 940, and a memory 930 that includes multiple locations for containing various software programs. In this example, memory 930 includes an update controller 982, one or more software products 983, and a software inventory 984 in location 932. Memory 930 also includes a software fix manager 985 and a fix list 986 in location 934, a preferred software inventory 987 in location 936, and one or more software fixes 988 in location 938.

CPUs 910 perform computation and control functions of system 900. All CPUs associated with system 900 may each individually comprise a single integrated circuit, such as a microprocessor, or may comprise any suitable number of integrated circuit devices and/or circuit boards working in cooperation to accomplish the functions of a central processing unit. All CPUs are capable of suitably executing the programs contained within memory 930 and acting in response to those programs or other activities that may occur in system 900.

Memory 930 is any type of memory known to those skilled in the art. This would include Dynamic Random Access Memory (DRAM), Static RAM (SRAM), flash memory, cache memory, etc. While not explicitly shown in FIG. 1, memory 930 may be a single type of memory component or may be composed of many different types of memory components. For example, memory 930 and CPUs 910 may be distributed across several different computers that collectively comprise system 900. For example, update controller 982 may reside on one computer with $CPU_1$, software fix manager 985 may reside on another computer system with a separate $CPU_2$, preferred software fix inventory 987 may reside on a third computer system with a different $CPU_{n-1}$ and software product fixes 988 may reside on a fourth computer with a different $CPU_n$. Alternatively, all components could be located on one computer with one CPU. Computer system 900 of FIG. 1 simply illustrates many of the salient features of the invention, without limitation regarding the physical location of CPUs 910 or memory locations within memory 930.

Bus 940 serves to transmit programs, data, status and other forms of information or signals between the various components of system 900. The preferred embodiment for bus 940 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 950 allows human users to communicate with system 900, normally through a workstation 970. Workstation 970 is preferably a computer system such as an IBM personal computer or RS/6000. Although system 900 as depicted in FIG. 1 contains only a single workstation 970, it should be understood that the actual number of workstations attached to system 900 will be a function of system design and user preference. Workstation 970 may also be a dumb terminal or other non-programmable computer input/output device which allows human interaction with computer system 900.

Auxiliary storage interface 960 represents any method of interfacing a storage apparatus to a computer system known to those skilled in the art. Auxiliary storage interface 960 allows auxiliary storage devices such as DASD 980 to be attached to and communicate with the other components of system 900. While only one auxiliary storage interface 960 is shown, the present invention anticipates multiple interfaces and multiple auxiliary storage devices such as DASD 980. For example, DASD 980 may be a floppy disk drive which is capable of reading and writing programs or data on a floppy disk. DASD 980 may also be any other type of DASD known to those skilled in the art. This would include CD-ROM drives, hard disk drives, optical drives, etc.

Network interface 975 is used to connect other computer systems and/or workstations to computer system 900 in networked fashion. One particular preferred networking configuration will be shown in FIG. 2. The present invention applies equally no matter how computer system 900 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include recordable type media such as floppy disks (e.g., disk 990) and CD ROMS, and transmission type media such as digital and analog communication links, including wireless communication links.

Software fix manager 985 compares software inventory 984 with preferred software inventory 987 and creates fix list 986. Fix list 986 is a list of software product synchronizations that preferably could be used to synchronize software products 983 on computer system 900 with the preferred software inventory. Update controller 982 applies the software product synchronization to computer system 900. If any software product fixes need to be installed, these products or fixes are usually retrieved from software product fixes 988.

Figure 2:
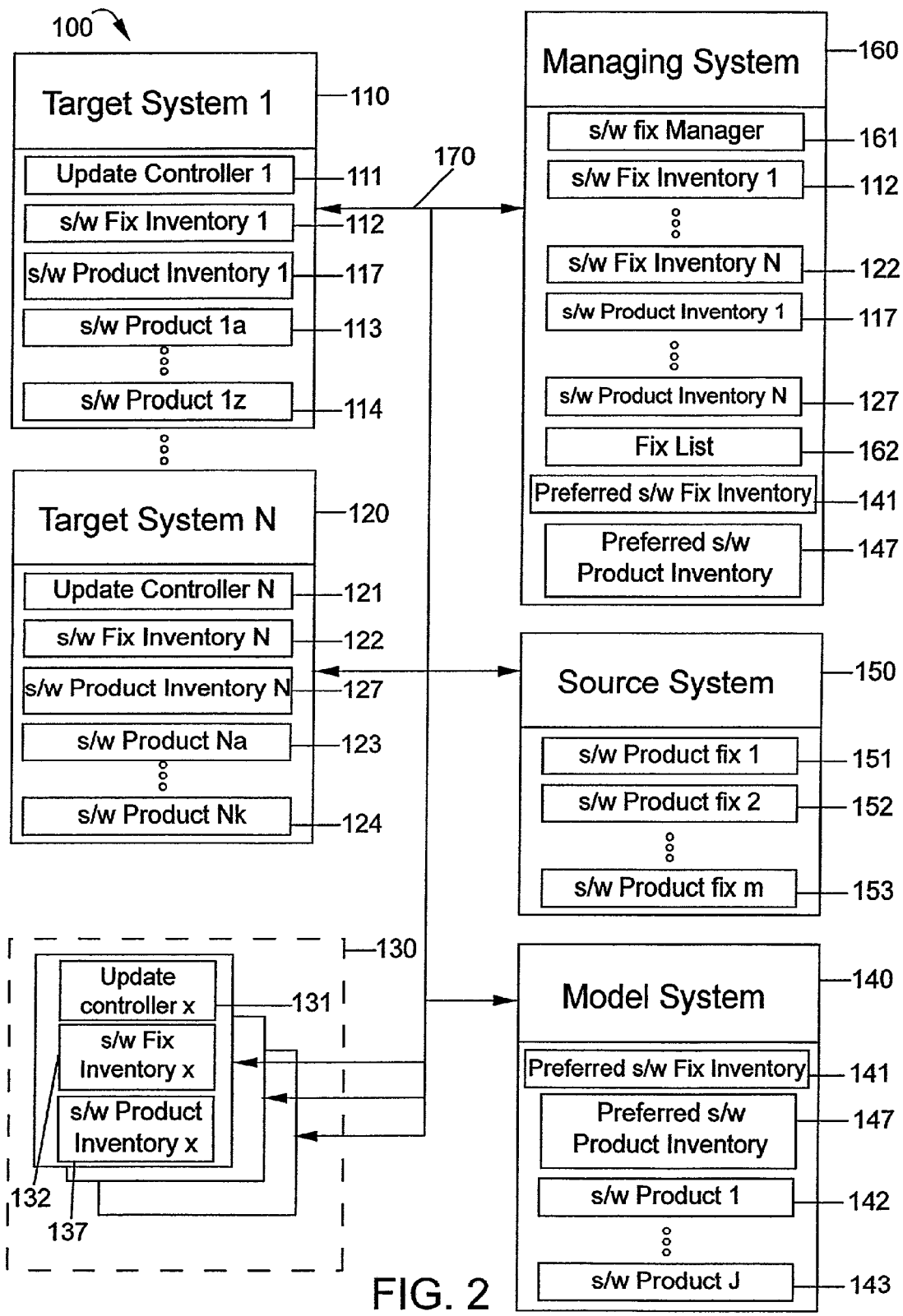
FIG. 2 is a network of computers that is in a preferred configuration, wherein software products on networked computers may be updated in accordance with a preferred embodiment of the present invention.

Turning now to FIG. 2, FIG. 2 illustrates computer network 100 that is in a preferred configuration for synchronizing software fixes on a number of different target systems. Computer network 100 comprises a multitude of target systems, such as target system 110 through target system 120 and target group 130. These systems communicate through network 170 with managing system 160, source system 150 and model system 140. Network 170 can be any network known to those skilled in the art, such as a token ring network, a star system network, or any other network. Each computer system in computer network 100 could be any type of computer system known to those skilled in the art, such as a personal computer, a work station, a server, or a super computer. Each computer will generally contain at least one processor, a memory coupled to the at least one processor, and an operating system. Each computer system can have more than one processor, storage device, or memory type. In addition, each computer system can be running any operating system known to those skilled in the art or hereafter developed.

Target system 110 comprises an update controller 111, software fix inventory 112, a software product inventory 117, and a plurality of software products, software product 113 through software product 114. Similarly, target system 120 comprises an update controller 121, a software fix inventory 122, a software product inventory 127 and software products 123 through 124. Group 130 is a group of computers that are selected as one group, which is solely a means of helping a user to group disparate computers. Each computer in the group will have separate update controllers (such as update controller 131), software fix inventories (such as software fix inventory 132), and software product inventories (such as software product inventory 137). Each computer's software inventory and update controller is completely separate from all the other computers' inventories and update controller. From a user perspective, the group is acted on as a group, but, in reality, each computer is acted on separately by the current invention.

The synchronization scenario is that the target systems have software products on each system and it is preferred that these software products be synchronized with a model system's software products. This synchronization could involve removing software products and software product fixes, if possible, for software products that are on the target system but are not on the model system. In addition, the synchronization could involve installing software product fixes to software products that are on the model system and are also on the target system. Furthermore, software products themselves could be installed on the target systems, if these products are not on the target systems but are on the model system. These concepts will become more apparent in later discussion.

Model system 140 comprises a preferred software fix inventory 141, a preferred software product inventory 147, and a number of software products, such as software products 142 through software product 143. Model system 140 has preferably been managed by system administrators into having the preferred number of software products and the software product fixes (not shown in FIG. 2) for these software products. Model system 140 should be heavily tested to make sure that all products operate as they should and to make sure that fixes, installations and un-installations of fixes and products also operate as they should and do not harm other software products. Thus, model system 140 provides a repository wherein known software fixes and software products can be placed and changes made without harming any of the other systems in the network. This should limit rediscovery problems as only one system is used to test software product updates, fixes, or installations. In addition, model system 140 provides a system that has a preferred group of software products, so that this system can be compared with other computers in the network.

If desired, there could be multiple model systems in the network. For instance, one model system could have a preferred group of financial software products, while another model system could have a preferred group of office software products. This bifurcated set up may be preferred when there are multiple operating systems in the network. In this case, each model system could comprise a group of software products for that model's particular operating system.

Each software fix inventory (inventories 112, 122, 132 and 141) and software product inventory (inventories 117, 127, and 147) may be discovered in a number of ways. Some operating systems keep a record of software fixes and products that are installed on the system. Thus, the software fix inventory and software product inventory for these types of operating systems and computers already exist. If no software fix inventory is currently kept on the computer system, the computer system may be queried by the update controller to determine what software products and fixes have been installed. Most operating systems will allow the update controller to query a target system (through application programming interfaces or through system or other configuration files) and determine what software products and software product fixes are installed.

Managing system 160 comprises software fix manager 161, software fix inventory 112 through software fix inventory 122 that are from target systems 1 through N, software product inventory 117 through preferred software inventory 127 that are also from target system 1 through N, preferred software fix inventory 141 and preferred software product inventory 147 that are from model system 140, and fix list 162. Managing system 160 can be any computer in the network, although it may be best to place software fix manager 161 on a managing system 160 that is a server, as a server allows better remote access to software fix manager 161. A copy of preferred software fix inventory 141 and preferred software product inventory 147 is now on managing system 160.

Once model system 140 has had the preferred software products installed, and the software product fixes installed to those products, the preferred software fix inventory 141 should be in a complete state. The preferred software fix inventory and the preferred software inventory then describe the preferred software configuration for the model system. In this state, the preferred software inventories are really just files. As such, once the files have been created and solidified, the files themselves can be sent to different networks. Furthermore, once the preferred software inventories are created, it is not really necessary to have a model system 140. However, it is preferred to have a model system 140, because the preferred software inventories will always be updated and improved. Additionally, subsequent software products or fixes for the software products that are currently installed in the model system may be installed and checked more easily with a model system. Thus, model system 140 provides a safe place to check new fixes and software products.

Software fix manager 161 has a variety of different functions. One function is to allow a system administrator to log into the managing system (and the software fix manager) and select the target systems that he or she would like to have synchronized with the preferred software fix inventory. Software fix manager 161 also, once fix list 162 is created, can display that fix list if desired. If some control over the fix list is desired, software fix manager 161 can allow a system administrator to select or deselect items in the fix list 162 so that those items will or will not be sent to each target system. Software fix manager 161 compares software fix inventories 112 through 122 with preferred software fix inventory 141 to create and update fix list 162, as will become apparent in later discussions. Additionally, software fix manager 161 accesses software product inventories 117 through 127 and the preferred software product inventory 147 during the creation and update of fix list 162. Fix list 162 is a result of the comparisons between the software inventories from the target systems and the preferred software inventories. Fix list 162 is preferably a union of the different software products synchronizations that will be sent to each target system. Software fix inventory 112 through software fix inventory 122 and software product inventories 117 through 127 could be sent by the target systems to the managing system upon the managing systems request. Alternatively, the managing system could retrieve those software inventories from the target systems.

Although not shown on managing system 160 in FIG. 2, the software inventories of each computer in group 130 could also be placed on managing system 160 to be compared with the preferred software inventories.

The present invention will be mainly described with reference to software fix inventories, as limiting the discussion reduces prolixity. However, the invention herein applies equally as well to software product inventories. Whereas comparing the software fix inventories with the preferred software fix inventory allows synchronizing software fixes, comparing software product inventories with a preferred software inventory (software inventory 147) allows software products to be installed or uninstalled. Comments about the software product inventory embodiment of the invention will be made when it is helpful to understand this embodiment.

After the fix list has been developed by software fix manager 161, the fix list 162 is sent to each target system that has been selected for updating. For instance, if target system 110 has been selected for updating, while target system 120 has not been selected, then the fix list would go to target system 110 and not go to target system 120. This also means that the software fix inventory 122 should not be used to create fix list 162. After fix list 162 arrives at each target system that will be updated, the update controller for that target system compares the software fix inventory of its own target system with the fix list. For instance, if target system 110 is going to be updated, update controller 111 will compare software fix inventory 112 with fix list 162. Because fix list 162 is preferably a union of a different software product synchronizations from different target systems, some of the software product synchronizations may not be applicable to target system 110. For example, if target system 110 does not have software product 123 (which is installed on target system 120), any software product synchronization in fix list 162 that applies to software product 123 will not be applied to target system 110. Update controller 111 will ignore software product synchronization for that software product. This will become more apparent later.

Target system 110 communicates though network 170 with source system 150 to retrieve any software products or fixes that will be applied to target system 110 by update controller 111. Update controller 111 can also attempt to remove software product fixes, if possible. Source system 150 comprises software product fix 151 and software product fixes 152 through 153. If target system 110 determines from fix list 162 that there is a software product synchronization (software product synchronizations will be discussed in more detail in reference to FIGS. 5–10) applicable to a software product on its computer and that the synchronization involves installing a software product fix, target system 110 communicates through network 170 to get the software product fix from source system 150. Source system 150, like the managing system 160 and model system 140, can be any computer in the network. Source 150 is a repository for software product fixes. The update controller retrieves the software product fix or software product from the source system by requesting a particular fix or product from the source system. The source system finds this fix or product then transmits the product or fix to the target system. The update controller, as part of the retrieval of the fix or product from the source system receives the product or fix.

Once target system 110 retrieves a software product fix from source system 150, update controller 111 then installs the software product fix or software product installation on the target system. If for any reason there is an error or the software product cannot be installed for some reason, the update controller will report that status to the managing system 160. In addition, the update controller will generally report other status information, such as whether the software product synchronization completed or not. Managing system 160 can then display this information to a system administrator that is performing or has directed the update to be performed on target 110.

Note that the software fixes 151 through 153 are independent programs or files that actually do the updating or installation of the software product. The update controllers get the program or file and then direct the operating system to execute, run, or load the program or file, which itself does the actual updating or installation. If desired, a software fix could simply be a file to be installed over a currently existing file. For instance, a Dynamic Link Library (DLL) file could be retrieved from the source system and then installed over a DLL that already exists. However, it is preferred that the software fix be an independent file that executes and performs whatever functions are necessary to install the fix.

In the software product inventory embodiment of the present invention, software fix manager 161 compares each software product inventory of selected target systems or target groups with preferred software product inventory 147. A fix list similar to fix list 162 may be made or additions to fix list 162 may be made that indicate which software products are to be installed or removed (un-installed). This "new" fix list is preferably a union of software products. The "new" fix list is sent to each target controller which then determines if the fix list applies to the target controller's computer, and the target controller applies the synchronizations. If software products are to be installed, the software products (not shown in source system 150 of FIG. 1) are retrieved from source system 150 and installed.

Thus, software fix manager 161 compares a number of software inventories from target system computers or target system groups with a preferred software inventory from a model system and creates a fix list. The fix list is then distributed to the target systems. Each target systems or target system group has an update controller that compares the fix list versus its own software fix inventory for its own computer and applies software product synchronizations to software products on its computer. Each target system retrieves any needed software products or fixes from source system 150.

Figure 3:
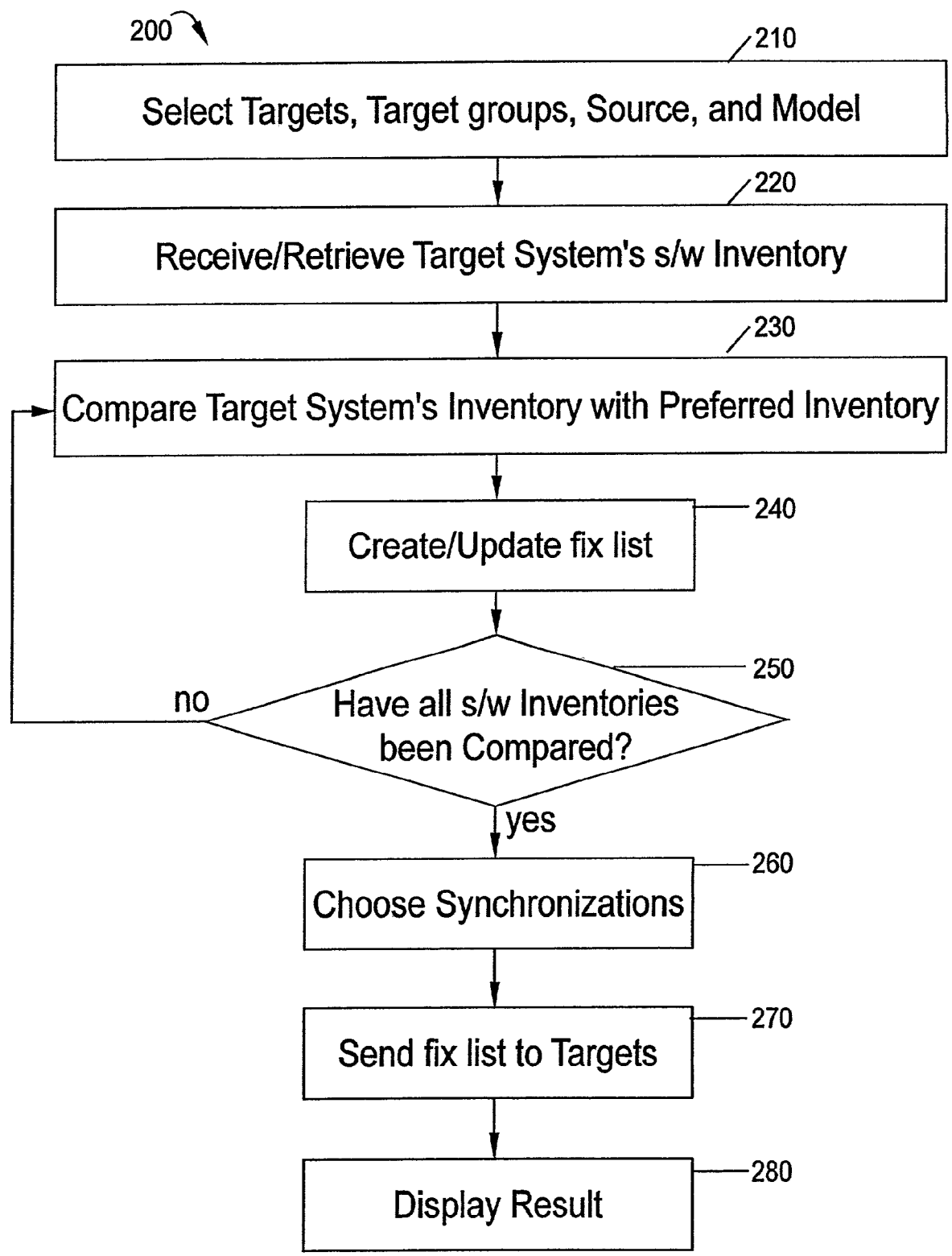
FIG. 3 is a preferred method performed on a managing computer for creating fix lists and synchronizing software products.

Turning now to FIG. 3, a method 200 is shown that illustrates a software administrator's interaction with a software fix manager and the steps that the software fix manager will take to create a fix list and send the fix list to each target system. This figure is applicable to both software fix inventories and software product inventories, and, thus, the generic term "software inventory" will be used in this method. Method 200 is performed when the system administrator wishes to update one or more target systems or target system groups. This will generally happen after the system administrator has solidified the software products and software product fixes that are installed on the model system, such that the model system has a preferred software fix inventory and a preferred software product inventory. As stated previously, the preferred software inventories, once the model system has been solidified, can simply be thought of and used as files.

Method 200 starts in 210 when a system administrator selects the targets or target groups that will be updated. In addition, the system administrator can also select the source and model systems. In this step, the preferred software inventory can also be selected as a file or as a file on a model system. For instance, if the preferred software inventory has been received through e-mail, then in this step a system administrator can also select the preferred software inventory as a file. Step 210 will generally be preformed by having the system administrator log into the managing system and the software fix manager. In step 220, all target systems' software inventories are received or retrieved. As stated previously, the managing system could direct each target system to send the managing system their software inventories, or the managing system could directly retrieve the software inventories from each target system or target system group. In addition, if the software inventory is not normally kept as part of the operating system, such that the update controller will have to query the target system, the managing system can direct the update controllers for the target system scheduled to be updated to query their individual target systems. Each update controller will then create an appropriate software inventory.

If it is desired that each target system's software inventory be retrieved independently, step 220 can be modified so that the software fix manager retrieves or receives only one software inventory at a time. This one software inventory may have steps 230 through 250 applied to it. Fetching all of the target systems' software inventories in step 220 (as FIG. 3 currents is written) is equally as good as fetching each inventory separately.

Figure 5:
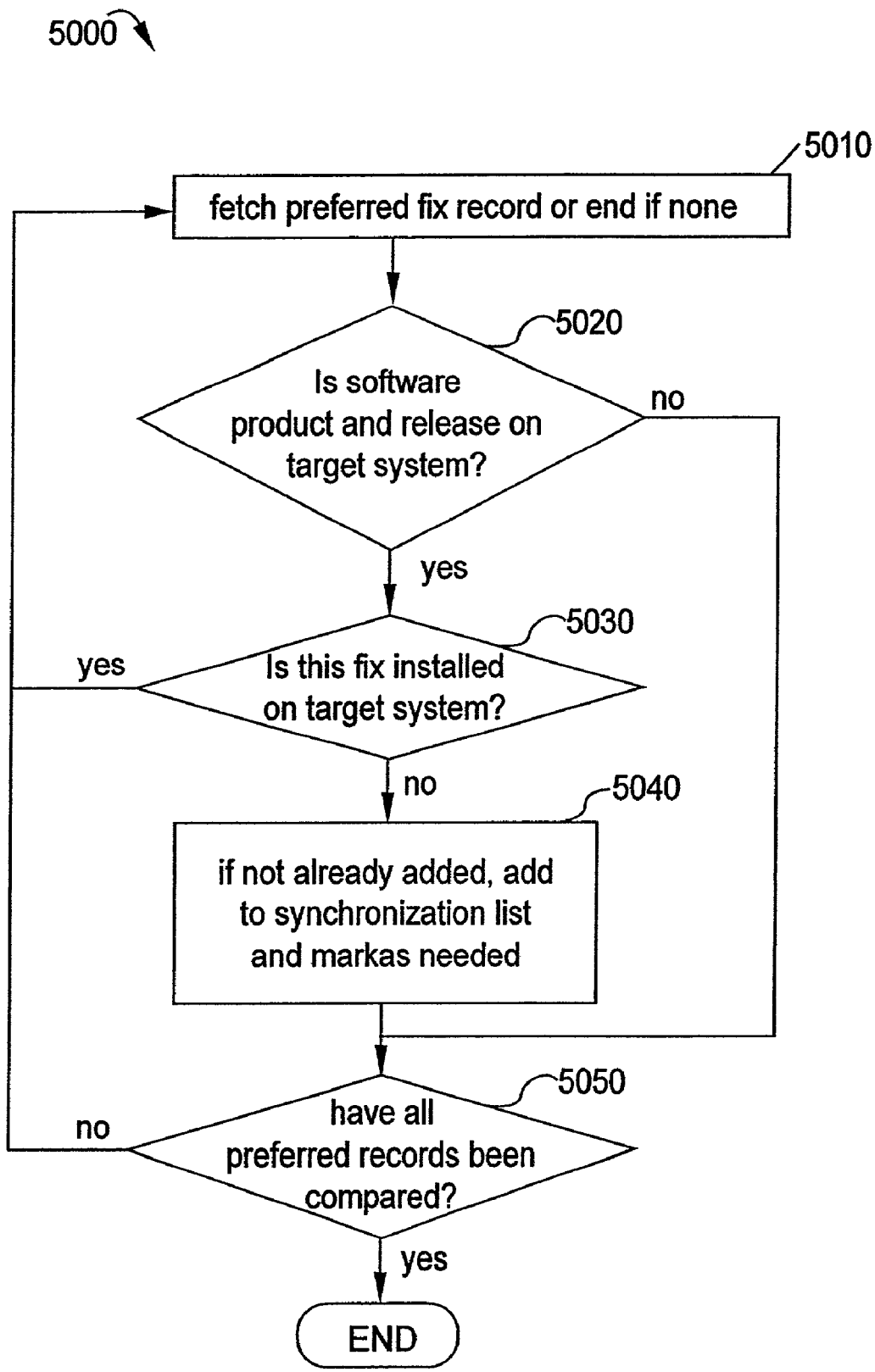
FIGS. 5 and 6 are preferred methods performed by a software fix manager when comparing software fix inventories.

Once one or more system inventories have been received or retrieved, the software fix manager then compares each inventory with the preferred software inventory to generate a fix list. The comparison occurs in step 230, and creation or updating of the fix list occurs in 240. A preferred method for comparing a software fix inventory with a preferred software fix inventory is shown in FIG. 5. If the fix list is not currently created, such that the first target system's software inventory is being compared with the preferred software inventory, then the fix list would be created at that time and filled with software product synchronizations. These first synchronizations are the differences between the software inventory on this first target system and the software inventory on the model system. This will be explained in more detail below.

If all software inventories from all target systems have not been compared to the preferred software inventory (step 250=No), then the next target system software inventory is compared (step 230). If all software inventories of all target systems have been compared (step 250=Yes), then a list of software product synchronizations are displayed on the screen, for the system administrator's use, in step 260. The system administrator can then select which synchronizations should be applied to the target systems that he or she has already selected. Note that this method assumes that all target system's inventories will be received or retrieved as one discrete step (step 220). However, if desired, each target system's software inventories could be received individually in step 220. Then, each one of the inventories would be independently compared versus the preferred inventory in step 230, the fix list updated in step 240, and if all of the software inventories have not been compared in step 250 (step 250=No), then steps 220 and 230 would be performed again to retrieve the software inventory and compare this software inventory with the preferred inventory.

As discussed below, the fix list is preferably a union of all software product synchronizations for all target systems and target system groups. The union is preferred because the software fix manager then does not have to generate individual lists of individual software products synchronizations for individual targets. Thus, the fix list gets sent to each target system and each update controller then compares the fix list with it's own software inventory to determine which software product synchronizations will and will not be applied. If this is not preferred, each individual target system could have it's own fix list created for it. However, the union is preferred as it minimizes network traffic and the fix list will be sent once to all target systems instead of having individual fix lists sent to each target system and target system group. In step 270, the fix list is sent to each target and each target group. Each update controller then compares the fix list, if the fix list is a union, to its software inventory and applies the applicable synchronizations its computer. If the fix list is not a union, each update controller just applies the fix list to its own target system. After the appropriate software product synchronizations have been applied by the update controller to its target system and software products, a status is sent to the software fix manager. Software fix manager then displays the results in step 280. Based on this result, the system administrator then knows which computer has had which software product synchronizations applied to it.

Figure 4:
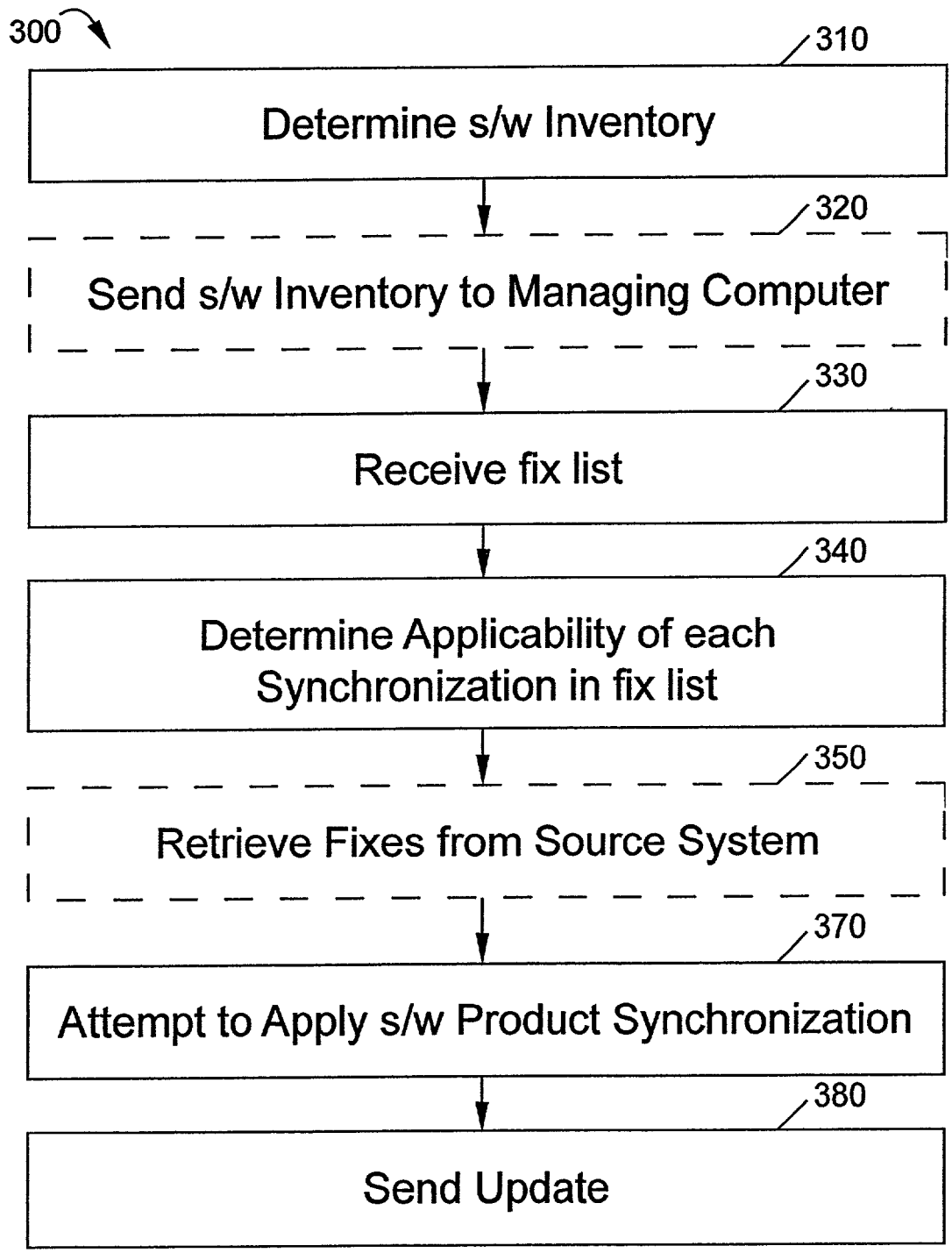
FIG. 4 is a preferred method performed on a target computer for synchronizing software products on the target computer.

Turning now to FIG. 4, a method 300 is shown that is performed by an update controller on a target system. This figure is applicable to both software fix inventories and software product inventories, and, thus, the generic term "software inventory" will be used in this method. Method 300 is performed whenever an update controller is informed by the software fix manager that a software update will be made, and the software update is actually performed. Method 300 begins, in step 310, when the update controller determines the software inventory. The software inventory is preferably already determined. Some systems, such as the OS/400 operating system that runs on AS/400 computers, create both a software product inventory and a software fix inventory whenever software products or fixes to the software products are installed or removed. For those operating systems that do not automatically make software product and fix inventories, as stated previously, the update controller can query the target system and determine a software product and fix inventories. If this is not possible, update controller 111 can be modified or the operating system on the target system can be modified to allow the update controller to determine software product and fix inventories.

Once the software inventory has been determined, the update controller for the target system sends a software inventory to a managing computer system (step 320). Alternatively, the software manager could retrieve the software inventory from the target system. Between steps 320 and 330, the software fix manager compares a list of software inventories and group software inventories with the preferred software inventory to determine a fix list. Once the fix list is determined, the fix list is sent to and received by each target system in step 330.

There are a number of ways of performing steps 340 and steps 350. One way is to determine the applicability of each synchronization in a fix list, which is step 340. If that synchronization entails retrieving a fix from a source system, step 350, then that fix could be retrieved from the source system. Note here also that source computer system 150 of FIG. 1 (not shown in FIG. 4) is not entirely necessary. If desired, the software product fixes could be sent with the fix list. This is particularly true if the fix list is going to be an individual fix list for each target system. If the fix list is a union, however, the number of software products that would have to be sent with a fix list may be too onerous for the network.

Alternatively, step 340 and step 350 may also be applied to the entire fix list. For instance, in step 340, when the applicability of each synchronization in the fix list is determined, this determination can be made for every single synchronization in the entire fix list. Then, if there are any fixes that must be retrieved from a source system (if the source system is being used) all of the fixes can be retrieved at one time. Alternatively, once the applicability of all synchronizations have been determined, each software fix could be retrieved individually from the source system, the software fix applied, the next software fix retrieved from the source system and applied, and so on. The particulars of how the software fixes are retrieved from the source system are discussed in reference to FIG. 9.

Regardless of how steps 340 and steps 350 are performed, in step 370 an attempt is made to apply one of the software product synchronizations. A software product synchronization could be an installation or removal of a current software fix. In addition, it could be an installation or removal of a software product. If there is any installation being performed, the file that is being installed should be received from the source system, if the source system is being used, or should be sent by the managing system to the target system. In step 370, the attempt to apply a software product synchronization should be preformed on a case by case basis. Although it may be possible in some systems to perform synchronizations in parallel, generally it is not possible to uninstall one fix while installing a second fix or to install more than one fix at a time. Thus, it is preferred that step 370 be performed serially, one synchronization at a time. To apply the synchronizations, the update controller directs the operating system on the target system to uninstall or install a software fix or software product.

After all synchronizations have been complete, or alternatively after each synchronization, the update controller sends an update to the software fix manager. This occurs in step 380. The software fix manager can then display results from that target system. This result may be used by the system administrator to determine the software fix level of each target system.

Thus, FIGS. 3 and 4 show a software fix manager and an update controller collaborating together to create a fix list and to distribute that fix list to each target system. Each target system then applies that fix list to itself through the update controller. Preferably, after this process each target system or target system group should have the same or very similar products installed at the same software fix level.

It is important to note that the current invention describes three major steps: comparing software inventories with a preferred software inventory and creating/updating software product synchronizations (preferably placed in the fix list); sending the synchronizations to target computers; and applying the synchronizations to the target computers. If desired, there can be a time period, determined by the system administrator, between each step. For instance, the system administrator might run the comparison one day, direct the software fix manager to send the synchronizations to the target computers the next week, and then, in the next week thereafter, direct the update controllers (preferably by having the software fix manager command each update controller to update) to update its respective target computer. Additionally, the current invention also allows a system administrator to only run the comparison and generation of the fix list, or to run the comparison, generation, and transmission of the fix list to each target. The former situation allows the system administrator to determine the update status of software on multiple computers in the network without going to each computer, while the latter situation allows the system administrator to prepare the target systems for synchronization and to run the synchronization at some later time.

Figure 9:
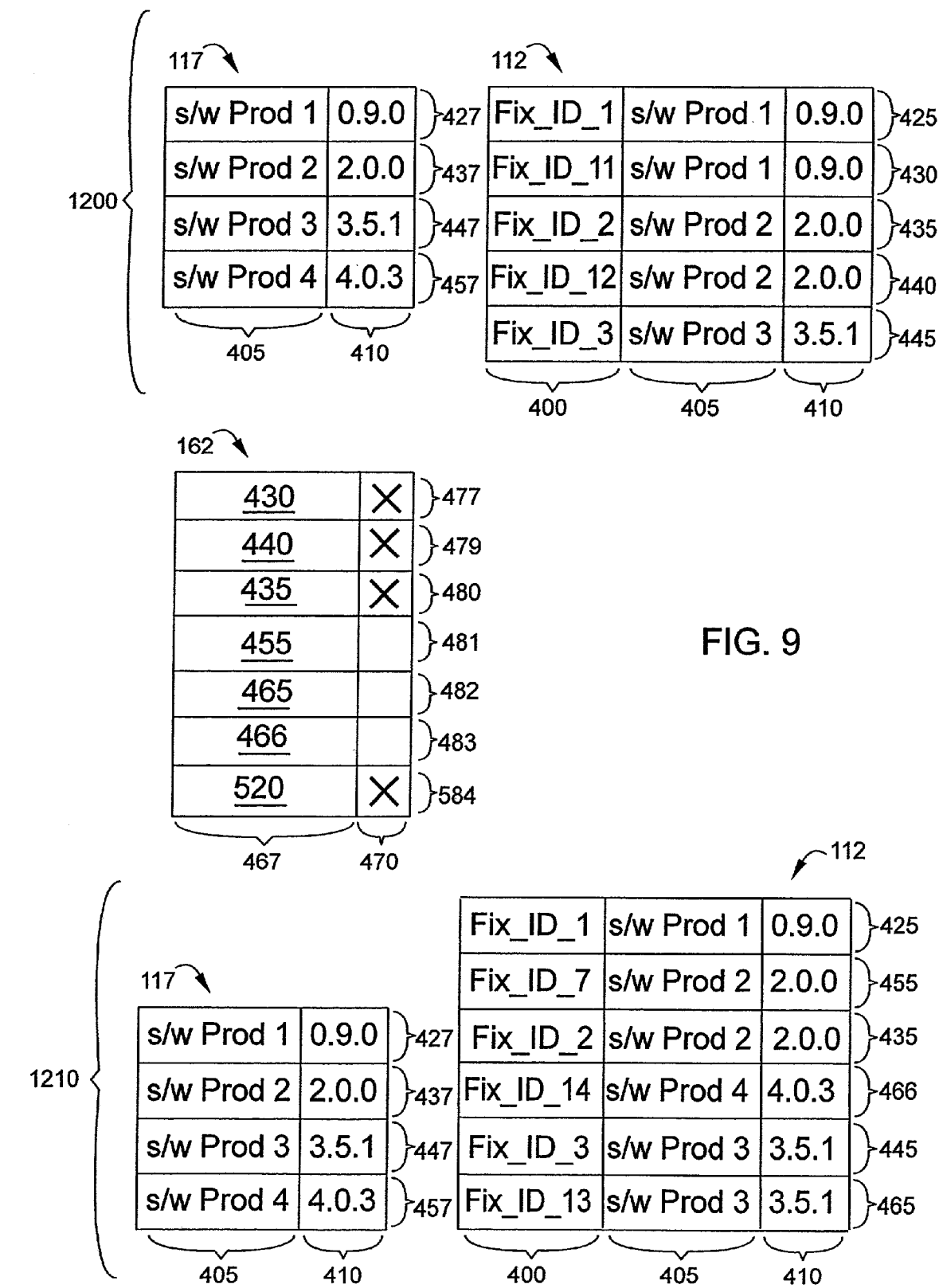
FIGS. 9 and 10 illustrate the result of applying software synchronizations from the fix list to computers in the network in accordance with a preferred embodiment of the present invention.
Figure 10:
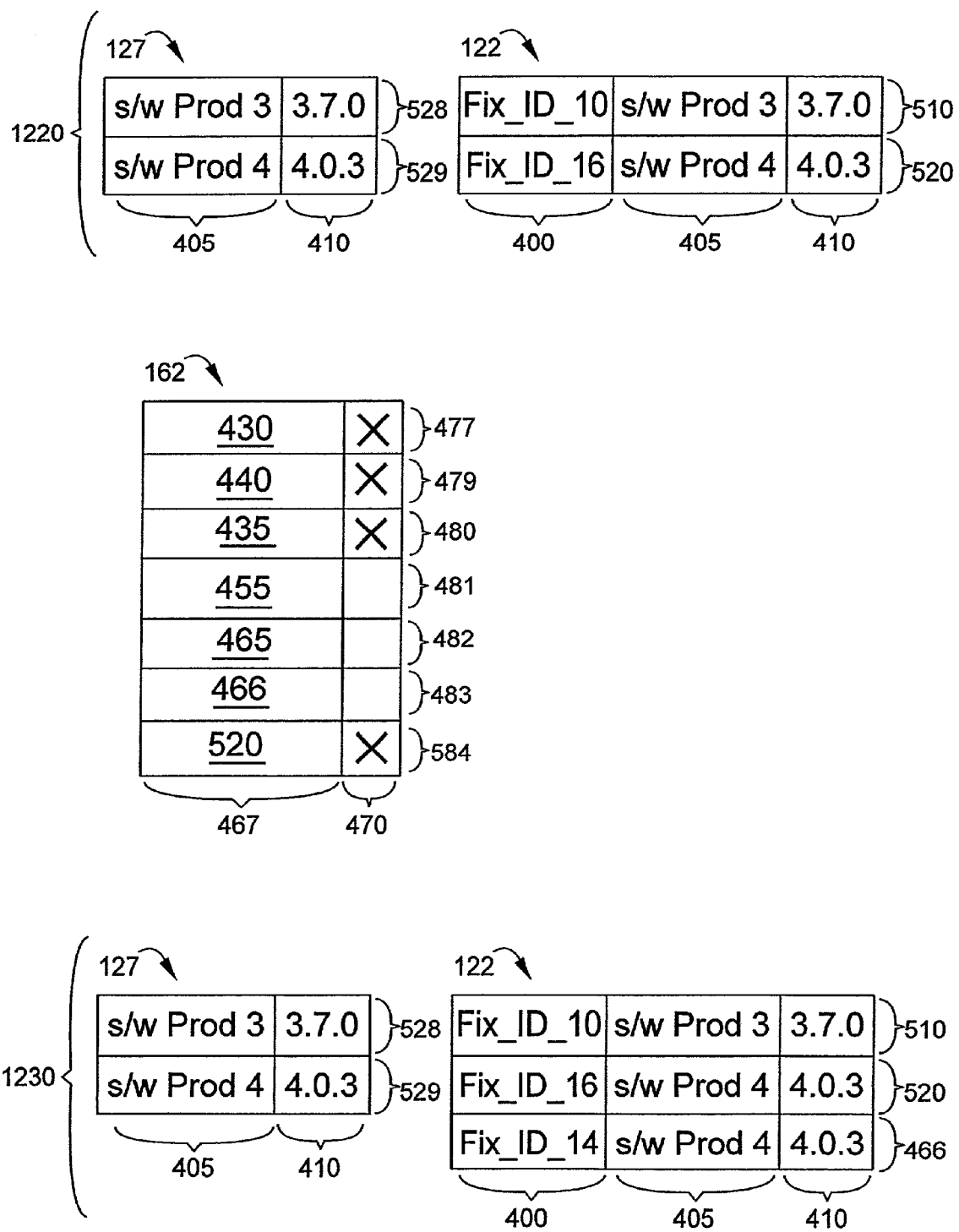

Now that the overall mechanisms have been described that allow software synchronization to occur, an in depth discussion of preferred software inventories and fix lists will now be shown in FIGS. 7–10. FIGS. 7 and 8 illustrate examples of comparisons done by the software fix manager. When discussing FIGS. 7 and 8, reference will also be made to preferred methods of comparison performed by the software fix manager and given in FIGS. 5 and 6. The software fix manager compares the preferred software inventory and software inventories from targets to create and update a fix list. FIGS. 9 and 10 illustrate examples of update controllers on two different target systems that use the fix list to synchronize the software on their systems. These update controllers compare the fix list received from the software fix manager with their own software inventories and apply software product synchronizations in the fix lists. In FIGS. 7–10, software fix inventories will be mainly described as the comparison inventories. However, the concepts that are used to create and update a fix list may be applied equally as well to product inventories, and some discussion of software product inventories will occur when appropriate.

Turning now to FIG. 7, FIG. 7 shows a software fix inventory 112 from target system 110 (not shown in FIG. 7) being compared with preferred software fix inventory 141 to create fix list 162. Software fix manager 161 (not shown in FIG. 7) compares software fix inventory 112 with preferred software fix inventory 141 to create fix list 162. Software product inventory 117 of target system 110 and preferred software product inventory 167 of the model system are also shown. Software fix inventory 112 comprises a plurality of fix records 425, 430, 435, 440, and 445. Similarly, preferred software fix inventory 141 comprises a plurality of fix records 450, 455, 460, 465, and 466. Each fix record indicates which software product fixes of that software product are installed. As previously discussed, the term "software product" that is used herein encompasses any type of complete software product, such as an operating system component, a driver, dynamic link libraries, programs, and files. The fix record indicates what fixes, improvements, or additions have also been installed for a particular software product at a particular release. Software fixes are tied to releases of software products: a particular software fix is made for one particular release of a software product. The fix record can be any indicia known to those skilled in the art that is used to determine a particular software fix.

In FIG. 7, software fix inventory 112 comprises fix records 425 through 445, and each software fix record has a fix identification 400, a product identification 405, and a product release 410. In the example of FIG. 7, there are a number of fix identifications 400, including fix identification one for fix record 425 and fix identification 11 for fix record 430. These two fix identifications are for software product one, as evidenced by product identification 405 in fix records 425 and 430. A fix identification is preferably a unique identifier that identifies this particular software fix. The fix identification is usually a number, but it could be any indicia that uniquely identifies one particular software fix. As an example of the unique identification for software fixes, assume that a software fix with a fix identification of "1008" is used to fix a DLL. The next day, another fix is created (or the former software fix modified) that fixes this same DLL. This new software fix preferably is given a new fix identification, such as "1009" or "1300", so that this software fix is uniquely identified from the previous software fix.

Product release 410 can also be alphanumeric if that is desired. The product and product release are not used to identify which software products are installed on target system 110. Instead, they are indicators used to identify the release of the software product to which the software fix is applicable. Software product inventory 117 (to be discussed below) identifies the software products installed on the target system.

Note that fix level identification 400 or product release 410 could be made to include a date, such that the current version could be tracked by date. In addition, software fix inventory 112 or fix record 425 through 435 could include another element, such as a date, to go along with the fix identification, product identification, and product release.

Software fix inventory 112 illustrates that there are fixes installed for software product two on target system 110. There are two software fixes for software product two at a release of 2.0.0 (indicated in product release 410), which are indicated by fix records 435 and 440. Software fix inventory 112 also illustrates that there is a software fix installed on target 110 for a third software product (software product three). The software fix with fix identification 400 of "Fix_ID_3," which is installed for the third software product at a release of 3.5.1, is indicated in fix record 445. Thus, target system 110 has fixes installed for three software products.

Software product inventory 117 indicates the software products that are installed on target system 110. In addition, the release of each software product is shown. Software product inventory 117 comprises a number of product records 427, 437, 447, and 457. Each product record comprises a product identification 405 and a product release 410.

Software product inventory 117 shows that the following products are installed at the following releases: software product one at release 0.9.0, software product two at release 2.0.0, software product three at release 3.5.1, and software product four at release 4.0.3.

It is important to note that, according to software product inventory 117, software product four is installed on target system 110. However, there is no indication by observing software fix inventory 112 that software product four is installed on target system 110. There is no indication because there are no software fixes installed for software product four. This example illustrates that the software product inventory and the software fix inventory are preferably independent. Additional software products may be installed without ever installing fixes for those products. It should also be noted that these inventories can be combined into one inventory. For instance, product inventory record 457 could be moved into software fix inventory 112 and have a fix identification field 400 added. If this field is blank, then this entry could indicate that it is a product record. If this field is filled, then this could indicate that this entry is a fix record.

Preferred software fix inventory 141 comprises preferred fix records 450 through 466. The preferred software fix inventory indicates that the model system has the following software fixes installed for the following software products: the fix that is identified by "Fix_ID_1" for software product one at release 0.9.0, as indicated by preferred fix record 450; the fix that is identified by "Fix_ID_7" for software product two at release 2.0.0, as indicated by preferred fix record 455; the fixes that are identified by "Fix_ID_3" and "Fix_ID_13" for software product three at release 3.5.1, as indicated preferred fix records 460 and 465; and the fix that is identified by "Fix_ID_14" for software product four at release 4.0.3, as indicated by preferred fix record 466.

Preferred software product inventory 147 comprises four product records 452, 453, 454, and 456. Preferred software product inventory 147 has the same entries as software product inventory 117. However, the preferred fix inventory 141 for the model system is different than fix inventory 112.

Fix list 162 is created when software fix manager 161 (not shown in FIG. 5 or 7) compares software fix inventory 112 with preferred software fix inventory 141. Fix list 162 comprises a plurality of software products synchronizations 477, 479, 480, 481, 482, and 483. Each software products synchronization comprises fix record 467 and an extra indication 470. Software fix manager 161 compares each fix record from software fix inventory 112 with each fix record from preferred software fix inventory 141. If there is a fix record in software fix inventory 112 that is not in preferred software fix inventory 141, this fix record is marked as extra. If there is a fix record that is on the model system (i.e., that is in the preferred software fix inventory) but is not on the target system (i.e., that is not in the software fix inventory system), then this software fix is marked as needed.

Figure 6:
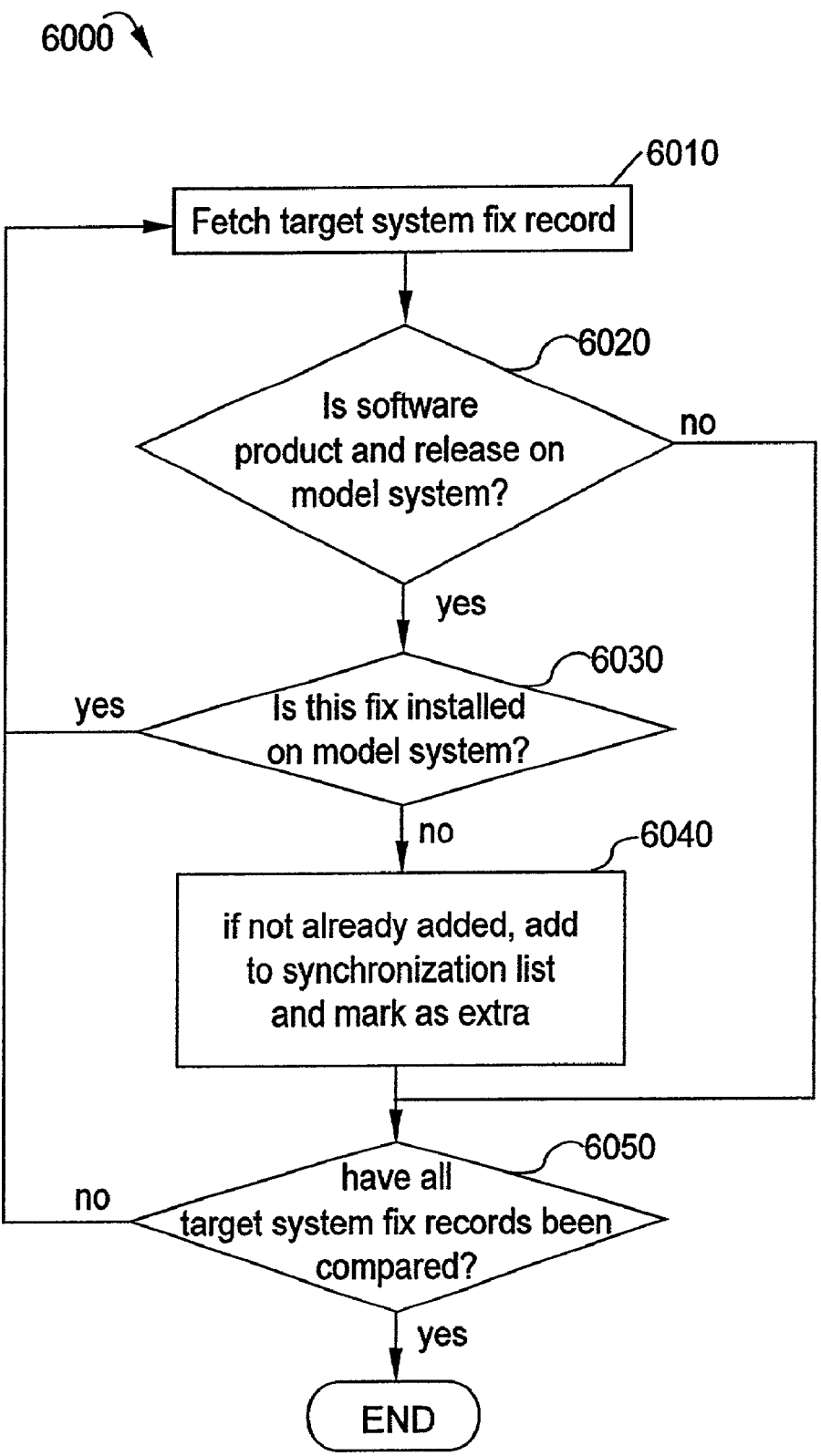

Turning now to FIGS. 5 and 6 in addition to FIG. 7, these figures show preferred methods for comparing a software fix inventory from a target with a preferred software inventory and updating or creating a fix list. FIGS. 5 and 6 are performed by the software fix manager and essentially correspond to steps 230 and 240 of FIG. 3. FIG. 5 illustrates a method 5000 that the software fix manager uses when marking a fix record as "needed." The software fix manager marks a fix record as needed and places the fix record into fix list 162 if a software fix for a software product at a particular release is in preferred software fix inventory 141 but not in the target system's fix inventory. To mark the fix as needed, the extra indication for this synchronization is left unchanged (e.g., the extra indication could be a boolean with a value of NEEDED, for example). Marking the fix record in the synchronization as needed means that the software fix that corresponds to this fix record should be installed on the target system. FIG. 6 illustrates a method 6000 that the software fix manager uses when marking a fix record as "extra." A fix record is marked as extra and placed into fix list 162 if a software fix for a software product at a particular release is not in preferred software fix inventory 141 but is in the target system's fix inventory. To mark the fix record as extra, the extra indication for this synchronization is changed (e.g., the extra indication could be a boolean with a value of EXTRA, for example). Marking the fix record in the synchronization as extra means that the software fix that corresponds to this fix record should be un-installed or removed from the target system.

Method 6000 of FIG. 6 begins when a target system fix record is fetched. Preferred fix record 450 of FIG. 7 is fetched in step 6010 of FIG. 6. In the example of FIG. 7, the first target system fix record fetched is fix record 425. In step 6020 of FIG. 6, the software fix manager determines if the software product and release indicated in product identification 405 and release 410 of fix record 425 is on the model system. To determine if the software product and release is on the model system, the software fix manager accesses preferred software product inventory 147 and attempts to match the software product and release in fix record 425 with a software product and release in preferred software product inventory 147. Because product record 452 contains the same product identification and release as fix record 425, the software fix manager proceeds to step 6030 of FIG. 6 (step 6020=yes). The software fix manager determines in this step if the fix is installed on the model system. To do this, the software fix manager compares fix identification 400 of fix record 425 with fix identifications 400 in preferred software fix inventory 141 for this software product and release. Because fix record 450 matches fix record 425, the software fix manager knows that the software fix corresponding to fix records 425 and 450 is installed on the target system (step 6030=yes).

Software fix manager 161 then fetches another target system fix record (step 6010), which in this example is fix record 430 of software fix inventory 112 (of FIG. 7). Again, the software fix manager determines if the software product at the release shown in fix record 430 is installed on the model system by searching software product inventory 147 for a match for the software product identification 405 and release 410 of fix record 430. In this example, the software fix manager determines that there is a software product at this release installed on the model system, as indicated by product record 452 (step 6020 of FIG. 6=yes). Next, the software fix manager determines that this fix is not installed on the model system (step 6030=no), because the fix identification 400 in fix record 430 of "Fix_ID_11" does not correspond to the fix identification 400 in fix record 450.

In step 6040 of FIG. 6, the software fix manager first determines if a synchronization corresponding to fix record 430, marked as extra, has been added to fix list 162 of FIG. 7. This portion of step 6040 is designed to prevent adding the same fixes more than once to fix list 162. Because a synchronization corresponding to fix record 430, marked as extra, is not found in fix list 162, the software fix manager adds synchronization 477 to fix list 162. The software fix manager adds synchronization 477 to fix list 162 by adding fix record 430 and marking extra indication 470 as EXTRA. An "X" in extra indication 470 of fix list 162 indicates that the fix record 467 corresponding to the extra indication is marked as EXTRA; a blank in extra indication 470 indicates that the fix record 467 corresponding to the extra indication is marked as NEEDED. Synchronization 477 indicates that, if possible, the software fix corresponding to fix record 430 should be removed. Software fix manager 161 then determines that not all target system fix records have been compared (step 650=no), and the software fix manager fetches another target system fix record (step 6010).

The software fix manager fetches fix record 435 from software fix inventory 112, determines that the software product at the release level indicated in fix record 435 is on the model system (step 6020 of FIG. 6=yes), as these elements match the product identification 405 and release 410 in product record 453 of software product inventory 147. The software fix manager determines that this fix is not installed on the model system (step 6030) because fix identification 400 of fix record 435 does not match fix identification 400 of fix record 455. The software fix manager adds synchronization 480 to fix list 162 (step 6040) to indicate that the software fix corresponding to fix record 435 should be un-installed or removed (note that extra indication 470 of synchronization 480 is marked as EXTRA). Because not all target system fix records have been compared (step 6050=no), the software fix manager fetches another target system fix record.

Following the steps in method 6000, the software fix manager fetches fix record 440 from software inventory 112 and determines that the fix corresponding to this fix record is not installed the model system. Software fix manager adds synchronization 479 to indicate that the software fix corresponding to fix record 440 should be removed from target system 110. The software fix manager fetches the last fix record, fix record 445, from software inventory 112. The software fix manager determines that the software fix corresponding to this fix record is installed on the model system because fix record 445 matches exactly the fix record 460 of preferred software fix inventory 141 (step 6030= yes). The software fix manager ends method 6000 at this point because the software fix manager ends the method if there are no more target system fix records to examine in step 6010.

The software fix manager has examined all the fix records in the software fix inventory 112 for target system 110. The software fix manager also compares the fix records in the preferred software fix inventory 141 to add to fix list 162. The software fix manager uses method 5000 to perform this comparison. Note that the order that the software fix manager runs these two methods, methods 5000 and 6000, is irrelevant.

Method 5000 starts when the software fix manager fetches a preferred fix record from preferred software inventory 141 (step 5020). The software fix manager chooses, for example, fix record 450. The software fix manager determines, in step 5020, if the software product at the release given in fix record 450 is installed on the target system. The software fix manager accesses software product inventory 117 and determines that product record 427 has the same product identification 405 and release 410 that fix record 450 has (step 5020=yes). The software fix manager next determines if the software fix corresponding to fix record 450 is installed on the target system (step 5030). To perform this step, the software fix manager compares fix identification 400 ("Fix_ID_1") of fix record 450 with fix identifications 400 of software fix inventory 112 that correspond to the product identification and release indicated in preferred fix record 450. Because fix record 425 matches preferred fix record 450 exactly, the software fix manager determines that this fix is installed on the target system (step 5030=yes).

The software fix manager fetches another preferred fix record in step 5010. This time, the software fix manager fetches fix record 455. The software product at the release indicated in preferred fix record 455 is installed on the target system, as indicated by product record 437 of software product inventory 117 (step 5020=yes). The software fix manager determines, in step 5030, if the software fix corresponding to preferred fix record 455 is installed on the target system. Again, the software fix manager compares the fix identification 400 of "Fix_ID_3" in preferred fix record 455 matches the fix identification 400 in fix records 430 and 435 of software fix inventory 112. These two fix records are the only two fix records that correspond to software product two at release level 2.0.0. The software fix manager determines that neither of the fix identifications in these two fix records correspond to fix identification 400 of preferred fix record 455 (step 5030=no). The software fix manager, in the first portion of step 5040, determines if the fix is already added by searching fix list 162 for fix record 455. In this case, no match is found. The software fix manager adds synchronization 481 to fix list 162 by adding fix record 455 in fix record 467 of synchronization 481 and by marking extra indication 470 of synchronization 481 as NEEDED (which, in the example of FIG. 7, is indicated by a blank extra indication 470). The software fix manager determines that not all preferred fix records have been compared (step 5040=no), and fetches the next preferred fix record.

Following the steps in method 5000, the software fix manager determines that the software product fix corresponding to preferred software fix record 460 has already been added to the target system (preferred software fix record 460 exactly matches software fix record 445). The software fix manager also determines that the software product fix corresponding to the preferred fix record 465 is not installed on target system 110, as the fix identifications 400 in fix records 445 and 466 do not match. Thus, the software fix manager adds synchronization 482 to fix list 162. Synchronization 482 indicates that the software product fix corresponding to fix record 465 should be installed (because extra indication 470 of synchronization 482 is marked as NEEDED) on target system 110.

Finally, the software fix manager compares the software product identification and release level of preferred fix record 483 with the software product identification and release level of the product records in software product inventory 117 (step 5020). The software fix manager determines through this process that software product four at release 4.0.3 is installed on the target system (step 5020=yes). The software fix manager also determines that this software fix corresponding to preferred fix record 466 is not installed on target system 110 (step 5030=no), because the software fix manager cannot locate any fix record in software inventory 112 that has a software product identification of "product four". Thus, the software fix manager adds synchronization 483 to indicate (by marking extra indication 470 as NEEDED) that the software product fix corresponding to fix record 466 should be installed (step 5040). The software fix manager then ends method 5000, in step 5040, because all preferred fix records have been compared.

It should be noted that the software fix manager may also compare (through a modified version of methods 5000 of FIG. 5 and 6000 of FIG. 6) software product inventory 117 with preferred software product inventory 147 to create a different fix list or add elements to fix list 162. In the example of FIG. 7, all the elements in these two software product inventories are the same. However, if the model system had a software product five installed, for example, and the target system did not have this product installed, an entry could be made in the fix list that indicates that this product should be installed on the target system. Similarly, if the target system had a software product five installed, but the model system did not, then an entry could be made in the fix list that indicates that this product should be un-installed on the target system.

Turning now to FIG. 8 in addition to FIGS. 5 and 6, FIG. 8 shows software fix inventory 122 of target system 120 (not shown in FIG. 8) being compared with preferred software fix inventory 141 to create additional entries in fix list 162. Also, a software product inventory 127 of target system 120 and preferred software inventory 147 of model system 140 are shown. As stated previously, fix list 162 in this example is a union of all the fixes for all the target computers. Because preferred software fix inventory has already been compared with the software fix inventory 112 of target 120, software product synchronizations 477 through 483 currently exist in fix list 162.

Software fix inventory 122 has two fix records 510 and 520. Fix record 510 indicates that a software product fix corresponding to fix identification 400 of "Fix_ID_10" for software product three (as shown in product identification 405) is installed at a product release level 410 of 3.7.0. Fix record 520 indicates that a software product fix corresponding to fix identification 400 of "Fix_ID_12" for software product four (as shown in product identification 405) is installed at a product release level of 4.0.3.

Software product inventory 127 indicates that two software products are installed (software products three and four, as indicated by software product identifications 405 of product records 528 and 529). These products are at release levels 3.7.0 and 4.0.3, as indicated by releases 410 of product records 528 and 529.

When the software fix manager performs method 500 of FIG. 5 to add needed fix records to fix list 162, the software fix manager fetches preferred fix record 450 in step 5010. Because the software product (software product one) is not installed on target system 120 (step 5020 of FIG. 5=no), as indicated by software product inventory 127, the software fix manager fetches preferred fix record 455 in step 5010. Because software product two is not installed on target system 120, the software fix manager fetches preferred fix record 460. For this preferred fix record, the product identification 400 in this preferred fix record matches the product identification 400 in product record 528. However, the release in preferred fix record 460 does not match the release in product record 528. Thus, the software fix manager determines that the software product at the release indicated in preferred fix record 460 is not installed on target system 120 (step 5020=no). The software fix manager fetches (step 5010) preferred fix record 465, which has the same release 410 as did preferred fix record 460. Thus, the software fix manager determines that the software product at the release indicated in preferred fix record 460 is not installed on target system 120 (step 5020=no).

The software fix manager fetches the final preferred fix record, preferred fix record 466. The software product and release for this preferred fix record matches the product identification 405 and release 410 in product record 529 (step 5020=yes). The software fix manager determines that the software product fix corresponding to preferred fix record 466 is not installed on target system 120 because the fix identification 400 in preferred fix record 466 does not match the fix identification 400 in fix record 520 (step 5030=no). The software fix manager checks to see if a synchronization has already been added to fix list 162 (step 5040). In this case, the synchronization has already been added as synchronization 483. Thus, the software fix manager does not add another synchronization to fix list 162, as synchronization 483 (which corresponds to fix record 466) already exists in fix list 162. The software fix manager determines that all preferred fix records have been compared (step 5050) and ends method 5000.

When the software fix manager runs method 6000 of FIG. 6 to add extra fixes to fix list 162, the software fix manager starts by fetching fix record 510 (step 6020) from software fix inventory 122 (shown in FIG. 8). The software fix manager determines that this software product (product three, as indicated by product identification 405 of fix record 510) is installed on the model system, but that the release 410 of fix record 510 does not match release 410 of product record 454 of preferred software product inventory 147. Thus, the software fix manager determines that this software product at this release (3.7.0) is not installed on the model system (step 6020=no).

The software fix manager fetches the final fix record, fix record 520, in step 6010. The software fix manager determines that the software product and release, as indicated by fix record 520, is installed on the model system (step 6020=yes). The software fix manager determines this because there is a match for both the product identifications and releases between fix record 520 and product record 456 of preferred software inventory 147. In addition, the software product fix corresponding to fix record 520 is not installed on the model system (step 6030=no) because fix identification 400 of fix record 520 does not match fix identification 400 of preferred fix record 466. Thus, the software fix manager determines that the synchronization corresponding to fix record 520 has not been added to the fix list, and the software fix manager adds synchronization 584 to fix list 162 (step 6040). This synchronization indicates that the software product fix corresponding to fix record 520 should be removed (as indicated by marking extra indication 470 of synchronization 584 as EXTRA). The software fix manager then ends method 6000 when it determines that all target system fix records have been compared (step 6050=yes).

Note that the software fix manager could be made to compare preferred product inventory 147 with product inventory 127 of target system 120. By comparing each product record 452 through 456 in preferred software product inventory 147 with each product record 528 and 529 in software product inventory 127, it could be determined that software products one and two are not installed on the target system. The software fix manager could add to fix list 162 (or create a new fix list) and indicate that software products at these release levels are to be installed. Similarly, if a software product five was installed on target system 120 but not installed on model system 130, the software fix manager could indicate that software product five is to be uninstalled.

Thus, FIGS. 7 and 8 show software fix manager 161 comparing a number of software fix inventories with the preferred software fix inventory in order to create a fix list of software product synchronizations. Fix list 162 in these examples is a union of software product synchronizations that is derived from the differences between the preferred software fix inventory and a multitude of individual software inventories from target systems. Although fix list 162 could be designed to be the synchronizations for only one target system, the union is preferred as it reduces network traffic (e.g., one union is sent to all computers vice sending a multitude of fix lists to a multitude of computers) and comparison and fix list construction time.

Now that fix list 162 is complete for these two target systems, the fix list is sent to each target system. Each update controller for the target systems then compares the fix list with its own software fix inventory. Each update controller, after the comparison, then attempts to uninstall or remove those fixes or software products marked as extra and attempts to install the software products in the software products synchronizations that are marked as needed.

For instance, in FIG. 9, target system 110 has received fix list 162. Target system 110's current software fix inventory 112 and software product inventory 117 are shown in FIG. 9 along with fix list 162. The top inventories 1200 of the drawing indicate the software product 127 and fix 122 inventories on target 110 before the update controller updates the target system, while the bottom inventories 1230 of the drawing indicate the software product 127 and fix inventories 122 after the update controller updates the target system.

It is important to note that software fix inventories and software product inventories may exist in a number of ways. Preferably, the operating system maintains these inventories such that the inventories are always resident and available. Thus, as the update controller applies synchronizations to its target computer, the operating system for the target computer updates software inventories 117 and 112. For those systems where the update controller needs to query the computer to create these software inventories, the software inventories shown in FIGS. 9 and 10 will be transitory. They will probably only exist prior to and during the update to the target system. If desired, the update controller can make these inventories persistent, and can be made to modify these inventories.

It is also important to note that the current invention uses the operating system to remove and install software fixes (and products, if desired). For installation of software fixes, the update controller passes the software fix to the operating system, directing the operating system to install the software fix, and the operating system does the installation. Similarly, for uninstallation of software fixes, the update controller passes the software fix to the operating system, directing the operating system to uninstall the software fix, and the operating system does the uninstallation. Although not shown in FIG. 9, fix list 162 could indicate an installation or uninstallation program to run, if this is desired. This program would then be handed to the operating system by the update controller, the update controller would direct the operating system to perform an installation or uninstallation, and the operating system would run the installation or uninstallation program. For software products, the update controller would similarly direct the operating system to install or uninstall a software product. The current invention could be extended to include "fix packs," where multiple software fixes are conglomerated—with or without compression—into one large file. Finally, the software fixes and product installation or uninstallation files themselves could be sent to the targets along with fix list 162, if desired.

Target system 110 indicates, through its software product inventory 117, that it has software products one, two, three, and four installed (indicated by product identifications 405) at particular releases 410 Thus, update controller 111 will examine fix list 162, looking for synchronizations related to any of these software products at these releases. Then, the update controller can determine the software product synchronizations in fix list 162 that are applicable to target system 110. If any of the synchronizations in fix list 162 are applicable to the target system, a second applicability determination is made by comparing fix records 425 through 445 in software fix inventory 112 with the fix records 467 in each of the software product synchronizations 477 through 483 and 584 in fix list 162. Each fix record 467 in fix list 162 must match a fix record in software fix inventory 112 if a software product fix corresponding to that fix record is to be removed. For installation of a software product fix, the product identification 405 and release 410 in a fix record in software product inventory 127 must match the product identification and release in a fix record of the fix list, and the fix identifications for these two fix records must not match. This is discussed in more detail below.

Because software fix record 430 in software product synchronization 477 matches software fix record 430 in software fix inventory 112, the update controller will attempt to remove the software product fix corresponding to this fix record, if possible. A match in this instance means that all elements (fix identification 400, product identification 405, and release 410) of each fix record are the same. Similarly, because fix record 435 of software product synchronization 480 matches fix record 435 of software fix inventory 112, the update controller will attempt to remove the software product fix corresponding to this fix record. Finally, because fix record 440 of software product synchronization 479 matches fix record 440 of software fix inventory 112, the update controller will attempt to remove the software product fix corresponding to this fix record.

When a software synchronization is marked as needed, the update controller will compare and attempt to match the software product identification 405 and release 410 in each fix record 425 through 445 with the product identification 405 and release 410 in each product record 427 through 457 of the software product inventory 117. In this case, software product synchronizations 481, 482, and 483 are for software products two, three, and four, respectively. Because the extra indications in fix list 162 for these fix records are marked as NEEDED (i.e., they are unmarked), indicating that these particular software products are to be installed on target system 110, the update controller will compare these fix records with the product records in the product inventory 117. If the product identification and release for the fix and product records match, the update controller will install the software fixes corresponding to fix records 467 of fix list 162. One caveat to this is when a fix record in both the fix list and the software fix inventory exactly match for software fixes that are marked as NEEDED (i.e., in addition to the product identifications and releases matching, both fix identifications 400 in the fix records match). In this instance, the software product fix is already installed on the target system, and the update controlled can either ignore the reinstallation of the fix or apply the synchronization and install the fix.

Thus, the update controller has determined that the applicable synchronizations for target system 110 are software product synchronizations 477 through 483. The update controller has also determined that software product synchronization 584 is not applicable to target system 110 because software fix inventory 112 does not contain fix record 520. As stated previously, for a software product fix corresponding to a fix record to be removed from a target system, the fix record 467 in the synchronization must exactly match a fix record in the target's software fix inventory. As shown in FIG. 8, fix record 520 has a fix identification 400 of "Fix_ID_16." None of the fix records in software fix inventory 112 match this fix identification. Therefore, update controller 111 determines that fix record 520 (and, thus, software product synchronization 584) is not applicable to target system 110.

Since there is no synchronization that affects the software fix that corresponds to fix record 425, the operating system does not modify fix record 425 of software fix inventory 112. This is shown in the software inventory 112 at the bottom 1210 of FIG. 9, where fix record 425 is unchanged.

Update controller 111, based on software product synchronization 477 being marked as extra in extra entry 470, will determine that the software product fix corresponding to fix record 430 should be uninstalled. Preferably, the update controller passes this information to the operating system, and then the operating system attempts to remove the software fix. The update controller, thus, informs the operating system that the software product fix, which corresponds to synchronization 477, for this software product is to be removed. In this example, the operating system (or the uninstall program run by the operating system) was able to remove the software fix corresponding to fix record 430. The operating system changes software product fix list 112 to indicated that the software fix corresponding to fix record 430 no longer exists on target system 110. Accordingly, software fix inventory 112 at the bottom 1210 of FIG. 9 no longer contains fix record 430.

Similarly, according to software product synchronization 479, update controller 111 will inform the operating system that the software fix corresponding to fix record 440 should be removed. In this example, the software fix corresponding to fix record 440 was removed by the operating system. Therefore, the software fix inventory 112 at the bottom 1210 of FIG. 9 does not contain fix record 440.

Next, according to software product synchronization 480, the update controller informs the operating system that the software fix corresponding to fix record 435 should be removed. In this example, the software fix corresponding to fix record 435 was not removed because there was some error when the operating system went to remove the software product fix. This error could have been, for example, the condition that it was impossible to remove the software product fix (e.g., if the software fix installed a new DLL and the previous DLL was no longer on the system) or that the uninstallation started but failed (e.g., for lack of disk space). Accordingly, software fix inventory 112 at the bottom 1210 of FIG. 9 still contains fix record 435.

Note that the uninstallations or removals occur before the installations. This is the recommended method of removal and installation. If desired, additional installation or removal instructions could be provided in fix list 162. Currently, fix list 162 does not include any type of order of installation or uninstallation. However, update controller 111 will generally uninstall any extra products before installing fixes or products for one particular software product. For instance, the software fixes corresponding to fix records 430 and 450 would usually be uninstalled before the software fix corresponding to fix record 455 would be installed (to be discussed below). If necessary, if it is critical to have an installation or uninstallation order, then an order could be placed in fix list 162.

Next, update controller 111 determines, by comparing the fix records in software fix inventory 112 with fix list 162, that software product synchronizations 481, 482, and 483 must applied to target system 110. To apply these synchronizations to target system 110, update controller 111 retrieves the software fixes corresponding to these synchronizations from the source system. Essentially, the update controller contacts the source system with the fix records 455, 465, and 466 corresponding to synchronizations 481, 482, and 483, respectively. The source system uses these fix records to locate and the software fixes corresponding to these fix records. The source system then transmits these software fixes to the update controller. The update controller receive the software fixes and informs the operating system that the software fixes are to be installed, and the operating system installs the software fixes. In this example, no problems occurred during the installation of these software fixes, and all three software fixes were installed. The operating system has added fix records 455, 465, and 466 to software fix inventory 112. This updated software fix inventory is shown at the bottom 1210 of FIG. 9.

Note that the software product inventory 117 is unchanged. As indicated by software product inventory 117 at the top 1200 of FIG. 9 (the software product inventory before synchronization) and the same product inventory at the bottom 1210 of FIG. 9 (the software product inventory after synchronization), no changes have occurred to the software product inventory. As previously stated, this inventory is preferably separate and distinct from software fix inventory 112. Changes to software product inventory 117 are made when a new software product is added or removed. If desired, the current invention can be made to install or remove software products.

Turning now to FIG. 10, software fix inventory 122 of target system 120 is shown, along with software product inventory 127. Additionally, fix list 162, and new software fix inventory 700 are shown. The inventories at the top 1220 of FIG. 10 illustrate the original software product and fix inventories before update controller 121 (not shown) uses fix list 162 to update target 120. The inventories at the bottom 1230 of FIG. 10 illustrate the resultant inventories after the update of target 120.

Update controller 121 of FIG. 1 compares the product identification and release of a fix record in fix list with the product identification and release of product records 528 and 529 in product inventory 127. If any of these match, then the fix record of the fix list that has the matching product identification and release is compared with fix records in software fix inventory 122 to further determine which software product synchronizations are applicable to its system. If a synchronization indicates that a software fix corresponding to a fix record is to be uninstalled, the fix records between the software fix inventory and the fix list must match. If a synchronization indicates that a software fix corresponding to a fix record is to be installed, fix records in the software fix inventory are compared with the fix record of the synchronization to see if the fix is already installed. If the fix is not installed, the fix is retrieved and installed.

In this instance, update controller 121 has determined that synchronizations 477 through 481 do not apply to target system 120 because these synchronizations are for software products one and two. Additionally, synchronization 482 does not apply to target system 130 because release 410 of fix record 465 is 3.5.1, while product records 528 and 529 of product inventory 127 indicates that software product three at this release is not installed on target system 120. While software product three at release 3.7.0 is installed on target 120, both the product identification 405 and the release 410 must match for a software fix corresponding to a fix record to be uninstalled or installed. Update controller 121 thus leaves software fixes for software product three untouched, and the operating system similarly leaves software fix inventory 122 untouched. This is shown in FIG. 10, where fix record 510 is in both software fix inventory 122 at the top 1220 of FIG. 10 (which is software fix inventory 122 before synchronization) and software fix inventory 122 at the bottom 1230 of FIG. 10 (which is software fix inventory 122 after synchronization).

The update controller determines that synchronizations 483 and 584 are applicable to its target system 120. Synchronization 483 indicates that the software fix corresponding to fix record 466 is to be installed. The product identification and release of this fix record correspond to the product identification and release in product record 529 of product inventory 127. Additionally, a search of fix inventory 122 indicates that there are no fix records in this inventory that match fix record 466. Therefore, the software fix corresponding to this fix record will be installed. The update controller has also determined that fix record 584 is applicable to its target system. Again, the product identification and release of this fix record correspond to the product identification and release in product record 529 of product inventory 127. A search of software fix inventory 122 finds a fix record (fix record 520) in the fix inventory that corresponds to the fix record in synchronization 584. Thus, the software fix corresponding to this fix record is to be uninstalled.

However, when update controller 121 attempts to uninstall the fix corresponding to this fix record, the uninstallation fails. Therefore, the operating system leaves fix record 520 unchanged, indicating that the software fix corresponding to this fix record is still installed. Finally, the update controller requests the software fix corresponding to fix record 466 from the source system. The update controller receives the file containing this software fix and informs the operating system that it needs to install this software fix. The operating system updates new fix inventory 122 with this information, as fix record 466 that is indicated in software fix inventory 122 on the bottom 1230 of FIG. 10. Note at this point that the update controller 121 could inform software fix manager 161 of the status. The status in this case would indicate that an error occurred and the software fix corresponding to fix record 520 was not uninstalled.

As a final note, the present invention could be made to install or remove software products. For instance, fix list 162 could indicate that software product two at a particular release level is to be installed. The update controller could receive this fix (which would be a complete software product) and then preferably direct the operating system to execute the fix to install software product two. The update controller could then add product records to product inventory 127 to indicate the newly installed software product. If this product was installed before the update controller determines if the fix list has any fixes for this product at its release level, then the update controller could install fixes for the newly installed product.

As shown in the previous examples, the preferred embodiments of the present invention describe a method and apparatus for synchronizing software in a network. By combining a software fix manager, which generates a fix list by comparing a preferred software fix inventory with software inventories from one or more computers in the network, with update managers running on computers in the network, a powerful synchronization system is created. This allows multiple computers or groups of computers to be synchronized with one preferred software fix inventory (preferably created by installing, removing, and testing software on a model system).

While the present invention has been particularly shown and described with reference to preferred embodiments thereof, it will be understood by those skilled in the art that various changes in form and details may be made therein without departing from the spirit and scope of the invention. For instance, the software fix manager and/or update controllers could be made to schedule comparisons and synchronizations in the evenings, at night, or on weekends. As another example, update controllers could be made to prepare the system for updating or perform after-updating functions, such as checking the computer's hard drive for errors before the update and deleting temporary files after the update.

What is claimed is:

1. An apparatus for synchronizing software, the apparatus comprising:
   at least one processor;
   a memory coupled to the at least one processor; and
   a software fix manager residing in the memory, the software fix manager comparing a software inventory of a target computer with a preferred software inventory to determine at least one software product synchronization for at least one software product on the target computer.

2. The apparatus of claim 1 further comprising an update controller residing in the memory that applies the at least one software product synchronization to the target computer.

3. The apparatus of claim 2 wherein the update controller applies the at least one software product synchronization by directing an operating system on the target computer to install at least one software product fix for the at least one software product, the at least one software product fix corresponding to the at least one software product synchronization.

4. The apparatus of claim 2 wherein the update controller receives the at least one software product fix from a source system.

5. The apparatus of claim 2 wherein the update controller applies the at least one software product synchronization by directing an operating system on the target computer to remove at least one software product fix for the at least one software product, the at least one software product fix corresponding to the at least one software product synchronization.

6. The apparatus of claim 2 wherein the update controller determines the software inventory of the target computer by querying the target computer.

7. The apparatus of claim 2 wherein the software inventory comprises a software product inventory, wherein the at least one software product synchronization indicates if the at least one software product should be installed or removed, and wherein the update controller applies the at least one software product synchronization by directing an operating system on the target computer to respectively install or remove the at least one software product.

8. The apparatus of claim 1 wherein the software inventory comprises a software fix inventory that comprises at least one fix record of at least one software product on the target computer, and wherein the preferred software inventory comprises a preferred software fix inventory that comprises at least one preferred fix record of at least one software product.

9. The apparatus of claim 8 wherein each fix record comprises a product identification, a fix identification, and a product release for the corresponding at least one software product.

10. The apparatus of claim 1 wherein the software fix manager retrieves the preferred software inventory from a model system.

11. An apparatus for synchronizing software in a network, the apparatus comprising:
    a managing computer comprising a software fix manager, the software fix manager comparing at least one software fix inventory of at least one of a plurality of target computers in the network with a preferred software fix inventory to determine at least one software product synchronization for at least one software product on the at least one target computer, the managing computer sending the at least one software product synchronization to the at least one target computer.

12. The apparatus of claim 11 wherein each of the target computers comprises an update controller and a software fix inventory, each update controller capable of applying software product synchronizations to its respective target computer, each software fix inventory comprising at least one fix record of at least one software product on the respective target computer, and wherein the update controller for the at least one target computer applies the at least one software product synchronization to the at least one target computer.

13. The apparatus of claim 12 wherein the at least one update controller applies the at least one software product synchronization to the at least one target computer by directing an operating system of the at least one target computer to install at least one software product fix for the at least one software product on the at least one target computer, the at least one software product fix corresponding to the at least one software product synchronization.

14. The apparatus of claim 13 further comprising a source system, the source system comprising a plurality of software product fixes, and wherein the update controller for the at least one target computer receives at least one software product fix from the source system.

15. The apparatus of claim 12 wherein the at least one update controller applies the at least one software product synchronization to the at least one target computer by directing an operating system on the at least one target computer to remove at least one software product fix for the at least one software product on the at least one computer, the at least one software product fix corresponding to the at least one software product synchronization.

16. The apparatus of claim 12 wherein the at least one fix record on each target computer comprises a product identification, a fix identification, and a product release.

17. The apparatus of claim 12 wherein at least one of the plurality of update controllers determines the software fix inventory for its respective target computer by querying the respective target computer.

18. The apparatus of claim 12 wherein each target computer further comprises a software product inventory, each software product inventory comprising at least one product record of at least one software product on the target computer, wherein the software fix manager further compares at least one software product inventory of at least one of the plurality of target computers in the network with a preferred software product inventory to add at least one software product synchronization for at least one software product on the at least one target computer to the fix list, and wherein the at least one software product synchronization indicates if the at least one software product should be installed or removed.

19. The apparatus of claim 11 further comprising a model system that comprises the preferred software fix inventory, the software fix manager retrieving the preferred software fix inventory from the model system.

20. The apparatus of claim 11 wherein the at least one software product synchronization is part of a fix list, wherein the fix list further comprises a plurality of software product synchronizations for a plurality of software products on the plurality of computers, and wherein the fix list is a union of software product synchronizations.

21. A method for synchronizing software, the method comprising the steps of:
 comparing a software inventory of a target computer with a preferred software inventory;
 creating at least one software product synchronization for at least one software product on the target computer; and
 applying the at least one software product synchronization to the target computer.

22. The method of claim 21 wherein the software inventory comprises a software fix inventory that comprises at least one fix record of at least one software product on the target computer, and wherein the preferred software inventory comprises a preferred software fix inventory that comprises at least one preferred fix record of at least one software product on a model system.

23. The method of claim 22 wherein each fix record comprises a product identification, a fix identification, and a product release for the corresponding at least one software product.

24. The method of claim 21 wherein the step of applying the at least one software product synchronization comprises the step of directing an operating system on the target computer to install at least one software product fix for the at least one software product, the at least one software product fix corresponding to the at least one software product synchronization.

25. The method of claim 24 wherein the method further comprises the step of receiving the at least one software product fix from a source system.

26. The method of claim 21 wherein the step of applying the at least one software product synchronization comprises the step of directing an operating system on the target computer to remove at least one software product fix for the at least one software product, the at least one software product fix corresponding to the at least one software product synchronization.

27. The method of claim 21 further comprising the step of determining the software fix inventory by querying the target computer.

28. The method of claim 21 wherein the method further comprises the step of the retrieving the preferred software fix inventory from a model system.

29. The method of claim 21 wherein the software inventory comprises a software product inventory, wherein the at least one software product synchronization indicates if the at least one software product should be installed or removed, and wherein the step of applying the at least one software product synchronization to the target computer comprises the step of directing an operating system on the target computer to respectively install or remove the at least one software product.

30. A method for synchronizing software in a network, the method comprising the steps of:
 providing a software fix manager that resides on a managing computer in the network, the managing computer comprising a preferred software fix inventory, the preferred software fix inventory comprising at least one preferred fix record of at least one software product;
 providing an update controller residing on at least one target computer in the network, the at least one target computer comprising a target software fix inventory, the target software fix inventory comprising at least one fix record of at least one software product on the at least one target computer;
 comparing the target software fix inventory with the preferred software fix inventory;
 creating and updating a fix list based on the comparison, the fix list comprising at least one software product synchronization for at least one software product on the at least one target computer;
 sending the fix list to the at least one target computer; and
 applying the at least one software product synchronization to the at least one target computer.

31. The method of claim 30 wherein the step of applying the at least one software product synchronization to the at least one target computer comprises the step of directing an operating system on the at least one target computer to install at least one software product fix for the at least one software product on the at least one target computer, the at least one software product fix corresponding to the at least one software product synchronization.

32. The method of claim 31 wherein the network further comprises a source system, the source system comprising a plurality of software product fixes, and wherein the method further comprises the step of the update controller receiving the at least one software product fix from the source system.

33. The method of claim 30 wherein the step of applying the at least one software product synchronization to the at least one target computer comprises the step of directing an operating system on the at least one target computer to remove at least one software product fix for the at least one software product on the at least one target computer, the at least one software product fix corresponding to the at least one software product synchronization.

34. The method of claim 30 wherein each preferred fix record and each fix record comprises a product identification, a fix identification, and a product release for the respective at least one software product.

35. The method of claim 30 further comprising the step of the update controller determining the target software fix inventory of the at least one target computer by querying the at least one target computer.

36. The method of claim 30 wherein the network further comprises a model system comprising the preferred software fix inventory, and wherein the method further comprises the step of the software fix manager retrieving the preferred software fix inventory from the model system.

37. The method of claim 30 wherein the at least one target computer is a plurality of target computers, wherein the fix list further comprises a plurality of software product synchronizations for a plurality of software products on the plurality of target computers, and wherein the fix list is a union of the plurality of software product synchronizations.

38. A program product comprising:
 a software fix manager comparing a software inventory of a target computer with a preferred software inventory to determine at least one software product synchronization for at least one software product on the target computer; and
 signal bearing media bearing the software fix manager.

39. The program product of claim 38 wherein the signal bearing media comprises transmission media.

40. The program product of claim 38 wherein the signal bearing media comprises recordable media.

41. The program product of claim 38 further comprising an update controller that applies the at least one software product synchronization to the target computer, and wherein the signal bearing media further bears the update controller.

42. The program product of claim 41 wherein the update controller applies the at least one software product synchronization by directing an operating system on the target computer to install at least one software product fix for the at least one software product, the at least one software product fix corresponding to the at least one software product synchronization.

43. The program product of claim 41 wherein the update controller receives the at least one software product fix from a source system.

44. The program product of claim 41 wherein the update controller applies the at least one software product synchronization by directing an operating system on the target computer to remove at least one software product fix for the at least one software product, the at least one software product fix corresponding to the at least one software product synchronization.

45. The program product of claim 41 wherein the update controller determines the software inventory of the target computer by querying the target computer.

46. The program product of claim 41 wherein the software inventory comprises a software product inventory, wherein the at least one software product synchronization indicates if the at least one software product should be installed or removed, and wherein the update controller applies the at least one software product synchronization by directing an operating system on the target computer to respectively install or remove the at least one software product.

47. The program product of claim 38 wherein the software inventory comprises a software fix inventory that comprises at least one fix record of at least one software product on the target computer, and wherein the preferred software inventory comprises a preferred software fix inventory that comprises at least one preferred fix record of at least one software product.

48. The program product of claim 47 wherein each fix record comprises a product identification, a fix identification, and a product release for the corresponding at least one software product.

49. The program product of claim 38 wherein the software fix manager retrieves the preferred software inventory from a model system.

50. A program product for synchronizing software in a network, the program product comprising:
a software fix manager able to reside on a managing computer, the software fix manager comparing at least one software fix inventory of at least one of a plurality of target computers in the network with a preferred software fix inventory to determine at least one software product synchronization for at least one software product on the at least one target computer, the software fix manager sending the at least one software product synchronization to the at least one target computer; and
signal bearing media bearing the software fix manager.

51. The program product of claim 50 wherein the signal bearing media comprises transmission media.

52. The program product of claim 50 wherein the signal bearing media comprises recordable media.

53. The program product of claim 50 further comprising an update controller able to reside on each of the plurality of target computers, each of the target computers comprising a software fix inventory, each update controller capable of applying software product synchronizations to its respective target computer, each software fix inventory comprising at least one fix record of at least one software product on the respective target computer, wherein the update controller for the at least one target computer applies the at least one software product synchronization to the at least one target computer.

54. The program product of claim 53 wherein the at least one update controller applies the at least one software product synchronization to the at least one target computer by directing an operating system of the at least one target computer to install at least one software product fix for the at least one software product on the at least one target computer, the at least one software product fix corresponding to the at least one software product synchronization.

55. The program product of claim 53 wherein the update controller for the at least one target computer receives at least one software product fix from a source system, the source system comprising a plurality of software product fixes.

56. The program product of claim 53 wherein the at least one update controller applies the at least one software product synchronization to the at least one target computer by directing an operating system on the at least one target computer to remove at least one software product fix for the at least one software product on the at least one computer, the at least one software product fix corresponding to the at least one software product synchronization.

57. The program product of claim 53 wherein the at least one fix record on each target computer comprises a product identification, a fix identification, and a product release.

58. The program product of claim 53 wherein at least one of the plurality of update controllers determines the software fix inventory for its respective target computer by querying the respective target computer.

59. The program product of claim 53 wherein the at least one software product synchronization is part of a fix list, wherein the fix list further comprises a plurality of software product synchronizations for a plurality of software products on the plurality of computers, and wherein the fix list is a union of software product synchronizations.

60. The program product of claim 50 wherein the software fix manager retrieves the preferred software fix inventory from a model system that comprises the preferred software fix inventory.

61. The program product of claim 50 wherein each target computer further comprises a software product inventory, each software product inventory comprising at least one product record of at least one software product on the target computer, wherein the software fix manager further compares at least one software product inventory of at least one of the plurality of target computers in the network with a preferred software product inventory to add at least one software product synchronization for at least one software product on the at least one target computer to the fix list, and wherein the at least one software product synchronization indicates if the at least one software product should be installed or removed.

* * * * *